United States Patent
Munro et al.

(10) Patent No.: US 11,295,071 B2
(45) Date of Patent: Apr. 5, 2022

(54) GRAPHICAL SYSTEMS AND METHODS FOR HUMAN-IN-THE-LOOP MACHINE INTELLIGENCE

(71) Applicant: 100.co, LLC, Miami Beach, FL (US)

(72) Inventors: Robert J. Munro, San Francisco, CA (US); Christopher Walker, San Francisco, CA (US); Sarah K. Luger, San Francisco, CA (US); Jason Brenier, Oakland, CA (US); Paul A. Tepper, San Francisco, CA (US); Ross Mechanic, San Francisco, CA (US); Andrew Gilchrist-Scott, Berkeley, CA (US); Gary C. King, Los Altos, CA (US); Brendan D. Callahan, Philadelphia, PA (US); Tyler J. Schnoebelen, San Francisco, CA (US); Edgar Nunez, Union City, CA (US); Haley Most, San Francisco, CA (US)

(73) Assignee: 100.co, LLC, Miami Beach, FL (US)

( * ) Notice: Subject to any disclaimer, the term of this patent is extended or adjusted under 35 U.S.C. 154(b) by 0 days.

(21) Appl. No.: 16/221,254

(22) Filed: Dec. 14, 2018

(65) Prior Publication Data

US 2019/0361966 A1 Nov. 28, 2019

Related U.S. Application Data

(63) Continuation of application No. 14/964,552, filed on Dec. 9, 2015, now abandoned.
(Continued)

(51) Int. Cl.
*G06F 40/169* (2020.01)
*G06F 16/242* (2019.01)
(Continued)

(52) U.S. Cl.
CPC .......... *G06F 40/169* (2020.01); *G06F 3/0482* (2013.01); *G06F 16/243* (2019.01);
(Continued)

(58) Field of Classification Search
CPC ...................................................... G06F 17/24
See application file for complete search history.

(56) References Cited

U.S. PATENT DOCUMENTS 7,664,644 B1* 2/2010 Tur ..................... G10L 15/1822
2003/0212544 A1* 11/2003 Acero et al. ............ G06F 17/27
(Continued)

OTHER PUBLICATIONS

Non-Final Office Action in U.S. Appl. No. 17/182,178 dated Nov. 15, 2021.

*Primary Examiner* — James J Debrow
(74) *Attorney, Agent, or Firm* — Stetina Brunda Garred and Brucker

(57) ABSTRACT

Methods and systems are disclosed for creating and linking a series of interfaces configured to display information and receive confirmation of classifications made by a natural language modeling engine to improve organization of a collection of documents into an hierarchical structure. In some embodiments, the interfaces may display to an annotator a plurality of labels of potential classifications for a document as identified by a natural language modeling engine, collect annotated responses from the annotator, aggregate the annotated responses across other annotators, analyze the accuracy of the natural language modeling engine based on the aggregated annotated responses, and predict accuracies of the natural language modeling engine's classifications of the documents.

20 Claims, 23 Drawing Sheets

Related U.S. Application Data

(60) Provisional application No. 62/089,736, filed on Dec. 9, 2014, provisional application No. 62/089,742, filed on Dec. 9, 2014, provisional application No. 62/089,745, filed on Dec. 9, 2014, provisional application No. 62/089,747, filed on Dec. 9, 2014.

(51) Int. Cl.
| | | |
|---|---|---|
| *G06F 16/35* | (2019.01) | |
| *G06F 16/93* | (2019.01) | |
| *G06F 16/28* | (2019.01) | |
| *G06F 16/36* | (2019.01) | |
| *G06F 16/951* | (2019.01) | |
| *G06F 16/332* | (2019.01) | |
| *G06F 16/2453* | (2019.01) | |
| *G06Q 50/00* | (2012.01) | |
| *G06F 40/30* | (2020.01) | |
| *G06F 40/40* | (2020.01) | |
| *G06F 40/42* | (2020.01) | |
| *G06F 40/137* | (2020.01) | |
| *G06F 40/221* | (2020.01) | |
| *G06N 20/00* | (2019.01) | |
| *G06F 3/0482* | (2013.01) | |

(52) U.S. Cl.
CPC ...... *G06F 16/24532* (2019.01); *G06F 16/285* (2019.01); *G06F 16/288* (2019.01); *G06F 16/3329* (2019.01); *G06F 16/35* (2019.01); *G06F 16/367* (2019.01); *G06F 16/93* (2019.01); *G06F 16/951* (2019.01); *G06F 40/137* (2020.01); *G06F 40/221* (2020.01); *G06F 40/30* (2020.01); *G06F 40/40* (2020.01); *G06F 40/42* (2020.01); *G06N 20/00* (2019.01); *G06Q 50/01* (2013.01)

(56) References Cited

U.S. PATENT DOCUMENTS

2005/0010605 A1* 1/2005 Conrad et al. .......... G06F 17/00
2015/0356260 A1* 12/2015 D'Souza et al. ....... G06F 19/328

* cited by examiner

Work Unit #1

February 26: NorthStar Realty Finance
Announces Plan to Spin-off European Real
Estate Business into a Separate Publicly-Traded
REIT February 25: Northstar Realty Finance: Chatham
Lodging Trust Caps Record Year with Strong
Fourth Quarter To view Conference Call-transcripts, click
http://www.buyselfsignals.net/BuySelfSignals
/report/Usnyse/Stock/Daily
/Link/1079_SSR_ConferenceCalltranscripts.html 27 Feb, 2015: Northstar Realty Finance's (NRF)
CEO David Hamamoto on Q4 2014 Results -
Earnings Call Transcript 27 Feb, 2015: Northstar Realty Finance (NRF) Q4
2014 Results - Earnings Call Webcast

ISIN: US66704R1005

N.NRF: NRF.N

Source: www.BuySelfSignals.com

Relevance

What is the best label for this document?

○ Highly_relevant ( Highly_relevant )
○ Semi-relevant ( Semi-relevant )
○ Totally_Irrelevant ( Totally_Irrelevant )

[Submit]

GRAPHICAL SYSTEMS AND METHODS FOR HUMAN-IN-THE-LOOP MACHINE INTELLIGENCE

CROSS REFERENCES TO RELATED APPLICATIONS

This application is a continuation of U.S. patent application Ser. No. 14/964,522, filed Dec. 9, 2015, and titled "GRAPHICAL SYSTEMS AND METHODS FOR HUMAN-IN-THE-LOOP MACHINE INTELLIGENCE," which claims the benefits of U.S. Provisional Application 62/089,736, filed Dec. 9, 2014, and titled, "METHODS AND SYSTEMS FOR ANNOTATING NATURAL LANGUAGE PROCESSING," U.S. Provisional Application 62/089,742, filed Dec. 9, 2014, and titled, "METHODS AND SYSTEMS FOR IMPROVING MACHINE PERFORMANCE IN NATURAL LANGUAGE PROCESSING," U.S. Provisional Application 62/089,745, filed Dec. 9, 2014, and titled, "METHODS AND SYSTEMS FOR IMPROVING FUNCTIONALITY IN NATURAL LANGUAGE PROCESSING," and U.S. Provisional Application 62/089,747, filed Dec. 9, 2014, and titled, "METHODS AND SYSTEMS FOR SUPPORTING NATURAL LANGUAGE PROCESSING," the disclosures of which are incorporated herein by reference in their entireties and for all purposes.

This application is also related to US non provisional applications Ser. No. 14/964,517, filed Dec. 9, 2015, titled "METHODS FOR GENERATING NATURAL LANGUAGE PROCESSING MODELS," Ser. No. 14/964,518, filed Dec. 9, 2015, titled "ARCHITECTURES FOR NATURAL LANGUAGE PROCESSING," Ser. No. 14/964,520, filed Dec. 9, 2015, titled "OPTIMIZATION TECHNIQUES FOR ARTIFICIAL INTELLIGENCE," Ser. No. 14/964,510, filed Dec. 9, 2015, titled "METHODS AND SYSTEMS FOR IMPROVING MACHINE LEARNING PERFORMANCE," Ser. No. 14/964,511, filed Dec. 9, 2015, titled "METHODS AND SYSTEMS FOR MODELING COMPLEX TAXONOMIES WITH NATURAL LANGUAGE UNDERSTANDING," Ser. No. 14/964,512, filed Dec. 9, 2015, titled "AN INTELLIGENT SYSTEM THAT DYNAMICALLY IMPROVES ITS KNOWLEDGE AND CODE-BASE FOR NATURAL LANGUAGE UNDERSTANDING," Ser. No. 14/964,525, filed Dec. 9, 2015, titled "METHODS AND SYSTEMS FOR LANGUAGE-AGNOSTIC MACHINE LEARNING IN NATURAL LANGUAGE PROCESSING USING FEATURE EXTRACTION," Ser. No. 14/964,526, filed Dec. 9, 2015, titled "METHODS AND SYSTEMS FOR PROVIDING UNIVERSAL PORTABILITY IN MACHINE LEARNING," and Ser. No. 14/964,528, filed Dec. 9, 2015, titled "TECHNIQUES FOR COMBINING HUMAN AND MACHINE LEARNING IN NATURAL LANGUAGE PROCESSING," the entire contents and substance of all of which are hereby incorporated in total by reference in their entireties and for all purposes.

TECHNICAL FIELD

The subject matter disclosed herein generally relates to creating one or more interfaces for processing human verification of natural language model accuracies. In some embodiments, a natural language modeling engine displays certain information on interfaces to confirm categorization, classification, or sorting the natural language modeling engine has performed for a set of documents into a scheme comprising various labels that may be present in the documents. In some embodiments, the interfaces are dynamically linked across multiple interfaces, such that interaction or verifications on one interface may adjust the information displayed on a linked interface.

BACKGROUND

Human communications in the digital age provide a deluge of information. Compounding the sheer volume of human communications in this technological era is the multitude of formats such human communications may come in, such as public news articles, social media posts, emails, customer feedback comments on a vendor website, or information circulated within a closed environment. It is difficult and time consuming for a human to integrate or recognize trends within these various communication formats with the volume of content involved in each, and any broad appreciation for what the creators of such communications may be expressing is therefore delayed. Recognizing trends or underlying meanings across the vast number of human communication sources, and appropriately categorizing unique nomenclature or slang that may be embedded, cannot be efficiently obtained without the aid of computer modeling tools.

Artificial intelligence tools can attempt to analyze and classify these information sources through metadata or other identifiers, but cannot efficiently analyze the true meaning of the internal content without verification oversight that is time consuming and costly to implement. Efficient verification of natural language modeling of a collection of documents is demanded to ensure such computer modeling tools are accurately recognizing appropriate categories of human communications within a collection of documents.

BRIEF SUMMARY

Graphic interface systems and methods for enabling human verification of natural language modeling by computer analysis tools, such as a natural language modeling engine, are described. In some embodiments, the verification is achieved by presenting a document with a list of potential labels or tasks describing the document on a work unit interface and aggregating the responsive inputs to the work unit interface (hereinafter, such responsive inputs are referred to as "annotations"). An annotation is not necessarily a confirmation of a natural language modeling engine's prediction of a label or task of a document. An annotation to a document or subset of a document (referred to as a "span") generally includes information indicating how the document or span should be classified into one or more topics or categories. In some embodiments, an annotation is a corrective departure from the natural language modeling engine's prediction. Aggregated annotations can, in some embodiments, be displayed on related interfaces and further manipulated to determine the accuracy of a natural language modeling engine in categorizing the document into a hierarchical structure of labels and/or "tasks" associated with the document.

A "task," in some embodiments, can be a clarification, reflection, sentiment, or other objective surrounding a document or label, such as, merely by way of example, "positive" or "negative" or various degrees between. "Tasks" may also refer to genres or groupings within labels and not merely binary interpretations of a label. In this disclosure, the hierarchical structure may also be thought of as a categorization, or classification, and is hereinafter referred to as an "ontology."

In annotating a document, the work unit interface may, in some embodiments, highlight or otherwise visually distinguish only a portion of the document (such as by underlining or italicizing), such portion of a document is referred to as a "span."

In some embodiments, a collection of documents is accessed through a natural language modeling engine. The natural language modeling engine can organize the documents into an ontology by analyzing, grouping, and classifying them based on the words within the documents, and the natural language modeling engine's logic processing, or use of past keywords for classification.

In some embodiments, the ontology is displayed on a first graphic user interface (GUI). The first GUI can include an option for the user of the first GUI, such as a project manager analyzing the documents, to send selected documents to a series of annotators to confirm the accuracy of the label or task for the particular document within the ontology as initially determined by the natural language modeling engine.

In some embodiments, to facilitate annotation, the document is presented as part of a work unit interface displaying relevant panes for efficiently verifying the accuracy of the natural language modeling engine's ontology. In some embodiments, a work unit interface is constructed by integrating a document, a label or task, a guideline describing the label/task or distinguishing it from other labels/tasks, and a human readable prompt soliciting a response from the annotator. In some embodiments, the document is displayed in a document pane of the work unit interface, and a series of eligible labels or tasks are displayed in a label pane adjacent to the document pane. According to various embodiments, there may be one or more labels or tasks presented in the label pane of the work unit interface. In some embodiments, the guideline describing the label or task is displayed on the work unit interface as a reference button adjacent to its respective label or task and when activated by a user of the work unit interface (such as by "clicking," or "pressing" or hovering a cursor over the reference button) the reference button opens a guideline pane displaying the label or task description.

In some embodiments, the human readable prompt is displayed in a prompt pane of the work unit interface. In some embodiments, the human readable prompt is generated from an intelligent queuing module of a natural language modeling engine. Depending on the embodiment, the human readable prompt requests confirmation of a label or task of the document displayed in the document pane as predicted by the natural language modeling engine, or requests the user of the work unit interface to select the most applicable label or task for the document from among a plurality of displayed labels or tasks in the label pane, and in still other embodiments requests the user identify all labels or tasks that are related to the document. One of skill in the art will appreciate many variations on the human readable prompt.

In some embodiments, the work unit interface is presented on a second GUI displayed to an expert annotator. The second GUI, when displaying a work unit interface, may include a create pane configured to receive an additional label or task, or revised guideline for a respective label or task within the label pane of the work unit interface. When a create label/task or create guideline input is received from an expert annotator on the second GUI, the second GUI may update the respective work unit interface on one or more second or third GUIs also configured to display the particular work unit interface. Third GUIs, in some embodiments, display the work unit interface to annotators that are not expert annotators, and such work unit interfaces do not include a create pane.

In some embodiments, updates from second GUIs may change what is displayed on work unit interfaces displayed on other second or third GUIs, and also affect which work unit interfaces are displayed to other expert annotators on a second GUI or to other annotators on a third GUI. In some embodiments, updates to the work unit interface may be the replacement of a label or task with a new label or task entered into a create pane. In some embodiments, updates to the work unit interface may be a new human readable prompt for selection of a label or task (for example, an expert annotator could direct a work unit interface to prompt "choose a label" rather than "confirm if the presented label is applicable"). In some embodiments, updates to the work unit interface may be to replace an existing guideline with a revised guideline entered into a create pane. In some embodiments, updates to the work unit interface may be supplement the given label(s) or task(s) with the label or task entered into a create pane. In some embodiments, updates to the work unit interface may be to supplement a given guideline to a label or task with a revised guideline entered into a create pane.

In some embodiments, the third GUI operated by an annotator, or second GUI operated by an expert annotator, receives an action on the work unit interface responsive to the human readable prompt. In some embodiments, the received action is an annotation of a label or a task of the document as requested by the human readable prompt. In some embodiments, the annotation is aggregated with all annotations to that particular work unit interface displayed received all third GUIs and second GUIs that were presented the work unit interface.

In some embodiments, the aggregated annotations are collected by the natural language modeling engine and displayed on the first GUI for further analysis and interaction by, for example, a project manager for the collection of documents, though one of skill in the art will envision other users or suitable roles for operating first GUI to interact with an aggregation of annotations.

In some embodiments, the aggregated annotations are displayed on the first GUI in an annotation agreement interface comprising a series of information panes. In some embodiments, a label feedback pane of the annotation agreement interface displays a plurality of label panes for each label or task within an ontology and displays the number of annotations the respective label or task received, and options to delete or edit the label or task. In some embodiments, the annotation agreement interface includes a learning curve pane, such learning curve displays a graphical representation of the number of annotations received for a particular label or task and the agreement among those annotations for the accuracy of that particular label or task. In some embodiments, the annotation agreement interface includes an annotation feedback pane. The annotation feedback pane, depending on embodiment, may display an aggregate annotation agreement score representing the overall accuracy of the ontology as determined by the annotation agreements across all labels or tasks of the ontology. In some embodiments, the annotation feedback pane includes an individual annotator agreement list displaying the agreement scores of each individual annotator relative to the other annotators.

In some embodiments, the annotation feedback pane includes a suggestion pane for collapsing labels or tasks into one another. By collapsing individual labels or tasks into groups of labels or tasks, the annotation agreement interface can reduce disagreements between annotators of a particular label or task, or reduce confusion annotators may have over minute differences between labels or tasks. For example, if the work unit interface displays labels of "securities" and "stock" for a particular document, an annotator may have trouble distinguishing the two and the respective labels will have a low annotation agreement score, however, if the two labels were recalculated as a common label, the annotation agreement score may improve. Such collapsed label or task calculations may indicate, to a project manager or user of a first GUI, the need to refine the labels or tasks within the ontology, or the need to refine the guidelines describing the labels or tasks.

In some embodiments, the annotation agreement interface includes an agreement per label or task graphical representation, such as a bar chart displaying the agreement per label or task relative to the other labels or tasks in the ontology that received annotations. In some embodiments, the agreement per label or task graphical representation further includes a collapsed agreement per label or task graphical representation displaying the agreement per label or task if two or more labels or tasks were collapsed into one another.

In some embodiments, the annotation agreement interface includes a per document agreement list displaying information such as which documents received the highest agreement or which documents received the lowest agreement. A user of the first GUI could potentially remove documents with lower annotation agreement from the ontology to improve the accuracy of the model much in the same way other analysis methods remove ambiguous information or "noise" from those data sets.

The aggregated annotations, either in their original annotation form, or as manipulated through the first GUI by the various pane described above, can then be used to display verified analysis of the natural language process engine ontology and indicate trends and sentiments contained within the collection of documents for that ontology with a certain degree of reliance (the annotation agreement score most readily serving as a proxy for reliance of the ontology). For example, an ontology comprising a collection of thousands of "tweets" from a Twitter hashtag of #Tesla could divide the tweets into labels based on common words across the tweets, such as "battery," "autonomous," and "Elon Musk" with tasks related to each label such as "positive" or "negative" and display the number of tweets that fall within each label and task and the number of annotations to each tweet and the annotation agreement amongst annotator to give a fast overview of the general disposition of the tweets within the ontology.

These and other embodiments of the present disclosure along with many of their advantages and features are described in more detail in conjunction with the text below and attached figures.

BRIEF DESCRIPTION OF THE DRAWINGS

Some embodiments are illustrated by way of example and not limitation in the figures of the accompanying drawings.

FIG. 8B illustrates a sample work unit interface arrangement of panes for collecting annotations from an annotator, according to some embodiments.

FIG. 8C illustrates a sample work unit interface arrangement of panes for displaying guideline information of a label or task, according to some embodiments.

FIG. 10C illustrates a sample interface display of a label feedback pane within a first GUI for displaying annotation agreements relative to specific documents within the collection of documents.

DETAILED DESCRIPTION

Figure 1:
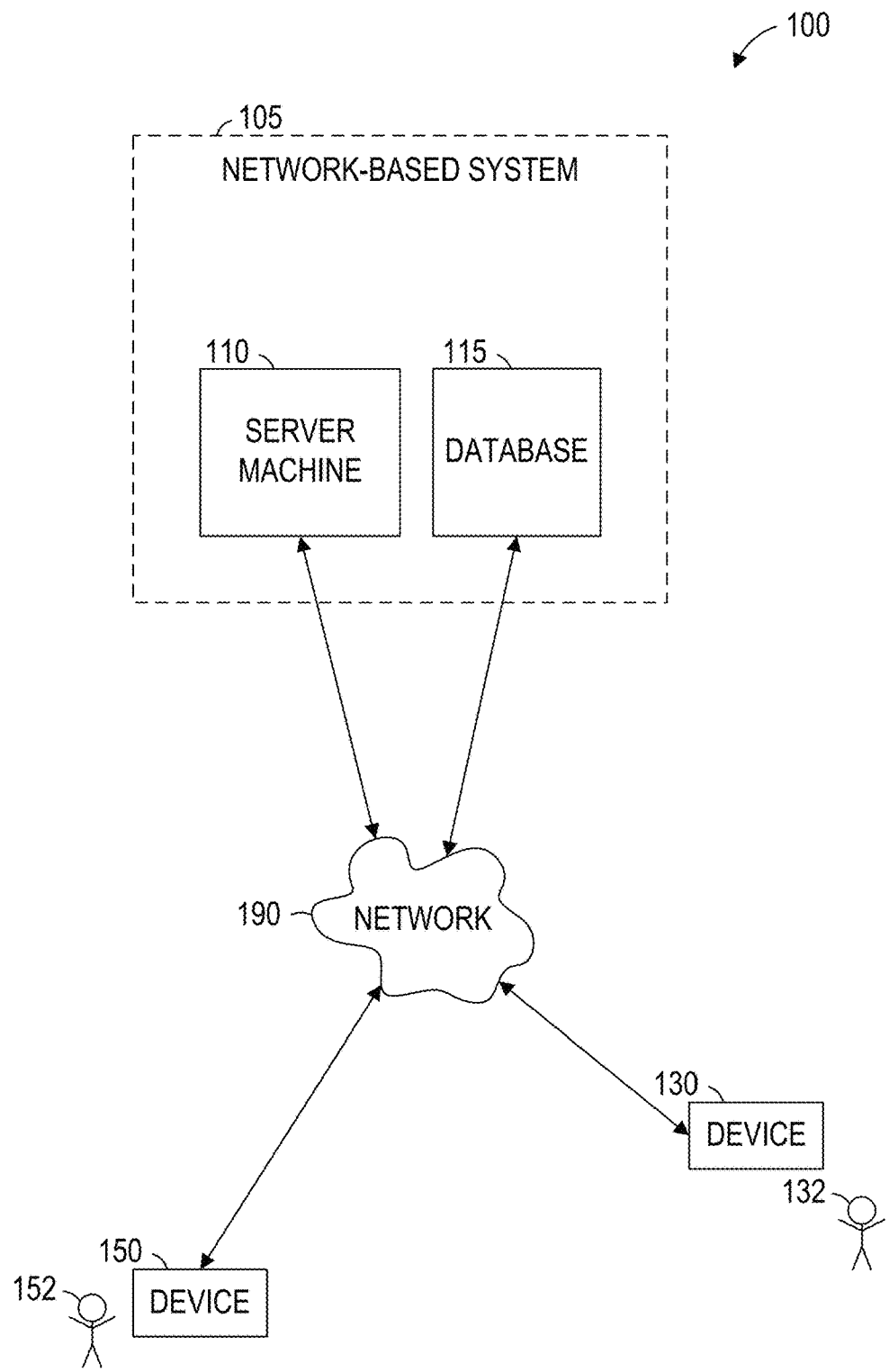
FIG. 1 is a network diagram illustrating an example network environment suitable for performing aspects of the present disclosure, according to some embodiments.

The following detailed description should be read with reference to the drawings when appropriate, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used in this specification and the appended claims, the singular forms "a," "an," and "the" include plural referents unless the context clearly indicates otherwise.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Systems, methods, and apparatuses are presented for causing the display of certain information and efficiently sharing responsive inputs to verify the accuracy of computer modeling in natural language processing. Marketing outlets, internal compliance departments, customer service departments, or even design and engineering industries can greatly benefit from rapid analysis of communications about products and policies. In the digital age, where communication can take many forms and the volume of information within those forms is staggering, analysis of these documents by human review can only be performed in a timely fashion by choosing a small sample of the communication. Such small sampling introduces error as to any conclusions, by casting doubt to how representative a sample is of the whole.

Computing modeling, by contrast, can analyze an entire corpus of documents to rapidly identify the general trends and commentary across all documents by using artificial intelligence to recognize keywords, syntax, and relation within documents in a much more timely fashion. By categorizing a collection of documents into topics, with a series of descriptive labels and tasks describing each document, a natural language modeling engine can build an ontology of documents demonstrative of overall sentiments and underlying meaning of trends across all documents.

To ensure accuracy of the ontology, and confirm the artificial intelligence is appropriately categorizing documents, a series of interfaces are described for presenting and receiving human annotations of a natural language modeling engine's classification.

FIG. 1 illustrates a network for relating users across interfaces for annotating documents that may be classified according to an ontology created by a natural language modeling engine. Network 100 includes user 132 operating device 130, user 152 operating device 150, and network based system 105. User 132 or user 152 may be one of a project manager, expert annotator, or annotator. Device 130 or device 150 may be a mobile device, desktop computer, tablet, or other computing device configured to operate any one of the interfaces described herein. Connecting user 132 or user 152 to network based system 105 through device 130 or device 150 is network 190. Network 190 may be a wireless network (such as wide area network, local area network), ethernet connections or other wired connection, or other suitable network system for linking computing devices.

Network based system 105 can include a server machine 110 configured to perform natural language modeling according to some embodiments as further described in this detailed description, and a database 115. Database 115 may store a collection of documents for server machine 110 to access and create an ontology around, or may store artificial intelligence rules for server machine 110 to access and apply to sorting a collection of documents, or may store guidelines and labels or tasks that have been used in other ontologies that server machine 110 can access to build additional ontologies. For example, if a previous ontology had been built for "JP Morgan Chase" and documents related to their investment banking practice, database 115 can store the labels and tasks and guidelines used in that ontology to inform server machine 110 which labels and tasks and guideline may be relevant in a subsequent "JP Morgan Chase" ontology relating to, for example purposes only, "customer service."

In some embodiments, user 132 or 152 is a customer or other third party seeking to have a collection of documents analyzed or classified into an ontology and transfers a collection of documents to network based system 105 through device 130 or 150 via network 190.

In some embodiments, network based system 105 creates an ontology of a collection of documents, and displays a work unit interface on a second or third GUI to verify the accuracy of the ontology to user 132 or user 152 through device 130 or 152. User 130 or 150 annotates the information in their respective interface, and network based system 105 aggregates the annotations to refine the ontology or draw further conclusions about the underlying documents and displays the results on a first GUI, which may be user 132 or user 152 depending on the embodiment.

Figure 2:
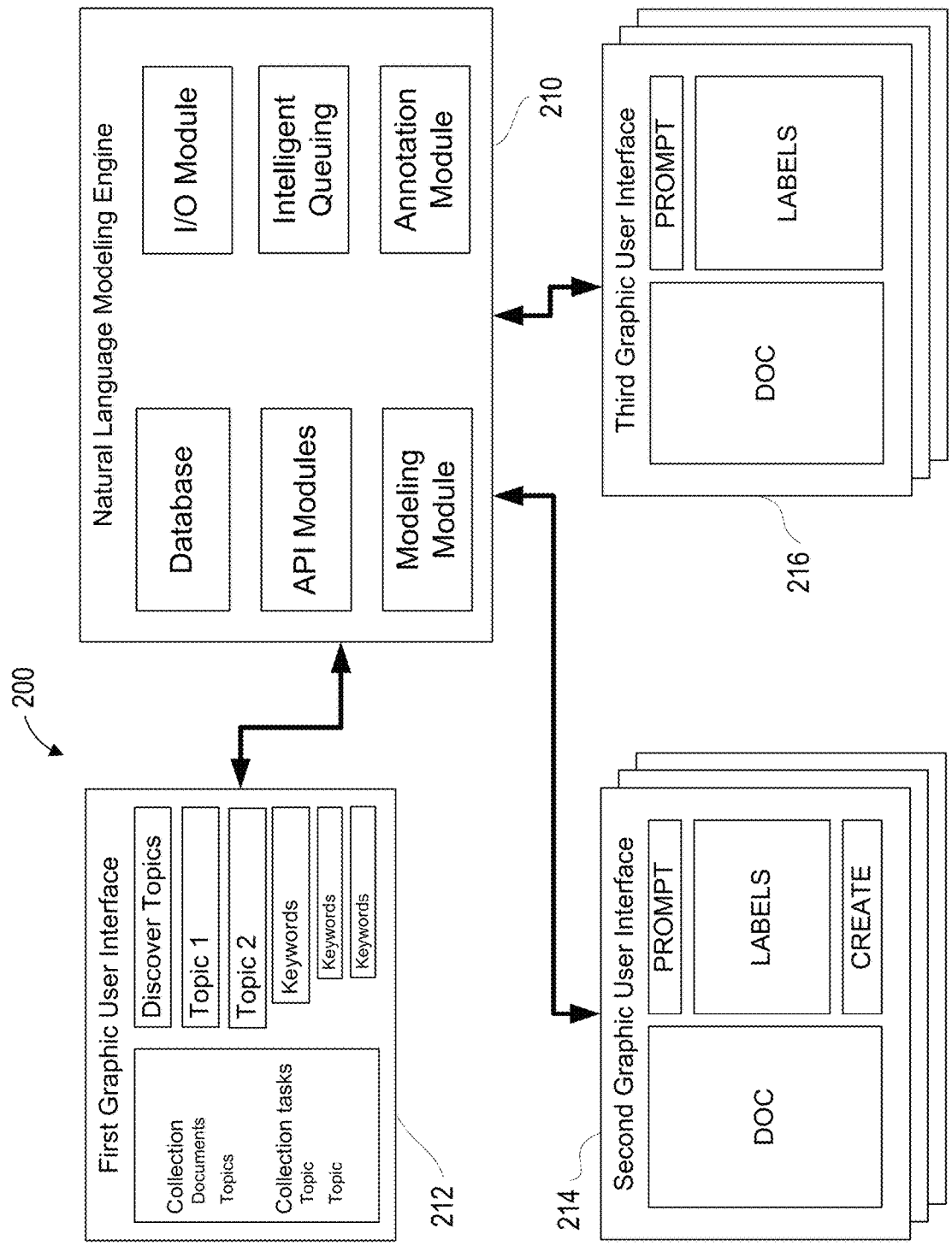
FIG. 2 is an illustration of a system diagram showing of a first, second, and third graphic user interface (GUI) operably coupled to a natural language modeling engine, according to some embodiments.

FIG. 2 illustrates a diagram of interface system 200 relating a first, second, and third GUI with a natural language modeling engine 210. In some embodiments, natural language modeling engine 210 is network based system 105 as described in FIG. 1. In some embodiments, natural language modeling engine 210 comprises a series of modules to include a database, which may be the same database as database 115 as described in FIG. 1; and an input/output (I/O) module configured to receive and transmit information throughout interface system 200. In some embodiments, natural language modeling engine 210 further comprises an API module configured to communicate through an I/O module with various devices, GUIs, and operating systems interacting with natural language modeling engine 210. In some embodiments, natural language modeling engine 210 further comprises an intelligent queuing module configured to generate human readable prompts for populating a work unit interface to elicit an annotation from expert annotators on a second GUI or annotators on a third GUI. In some embodiments, natural language modeling engine 210 further comprises an annotation module for constructing a work unit interface with at least a document from a database, a human readable prompt from an intelligent queuing module, and a label or task from a database. In some embodiments, an annotation module is further configured to aggregate received annotations from across a plurality of work unit interfaces and compute agreements and relationships between the aggregated annotations. In some embodiments, natural language modeling engine 210 further comprises a modeling module for constructing an ontology from a collection of documents on a database. In some embodiments, a modeling module is configured to modify an ontology in response to aggregated annotations received from a plurality of work unit interfaces across second GUIs 214 or third GUIs 216, or the manipulations to an aggregated set of annotations as received from a user of a first GUI 212.

In some embodiments, operably coupled to natural language modeling engine 210, such as by network 190 as described in FIG. 1, are first GUI 212 operated by a project manager or similar user role for managing the collection and using information created by the ontology, second GUI 214 operated by an expert annotator, and third GUI 216 operated by an annotator. Though depicted as individually coupling to natural language modeling engine 210, each of first GUI 212, second GUI 214 and third GUI 216 may, in some embodiments, be directly connected to one another, such that an input from second GUI 214 may be transmitted to third GUI 216 without intermediary communication with natural language modeling engine 210.

In some embodiments, a project manager can, through first GUI 212, access a collection of documents in natural language modeling engine 210. The project manager can select certain topics, create topics, or review a set of keywords for suggested topics provided by natural language modeling engine 210, and the modeling module of natural language modeling engine 210 can then build an ontology for that topic with a hierarchical structure of labels and tasks of the documents related to that topic.

For example, for a collection of Twitter tweets with the hashtag #Chase, a project manager may want to determine the general disposition of the tweets as, and if, they relate to Chase banking. In one embodiment, the project manager can create a topic for the tweets specifically with the name "Chase Bank" and the modeling module responds by identifying and organizing the tweets into an ontology based on that topic with sub labels and tasks further refining the disposition of the tweets. In some embodiments, certain tweets will be excluded, for example those relating to baseball player Chase Utley that may otherwise have the hashtag #Chase in it. In some embodiments, a "relevant" and "irrelevant" label within the ontology will distinguish the #Chase tweets relating to banking or baseball.

In some embodiments, the annotation module of natural language modeling engine 210 creates a work unit interface to display to expert annotators operating second GUI 214 or annotators operating third GUI 216. As depicted, interface system 200 may include a plurality of second GUI 214 or third GUI 216. In some embodiments, the annotation module selects certain documents from the ontology displayed on first GUI 212 to populate a work unit interface. In some embodiments, the document selected is merely to confirm the accuracy of the label or task of the placement within the ontology. In some embodiments, the document is selected because the modeling module cannot determine which label or task of the ontology to document should be applied to based on its own processing rules.

In one embodiment second GUI 214 is distinguished from third GUI 216 by having a create option when displaying a work unit interface. The work unit interface is described in further detail in other parts of this disclosure. For purposes of describing the role of each interface in relation to one another; second GUI 214 or third GUI 216 receive annotations from a respective expert annotator or annotator, and the annotation module of natural language modeling engine 210 aggregates the annotations. First GUI 212 displays the aggregated annotations to a project manager to indicate the accuracy of the ontology or suggestions for categorizing the information to be more accurate.

Figure 3:
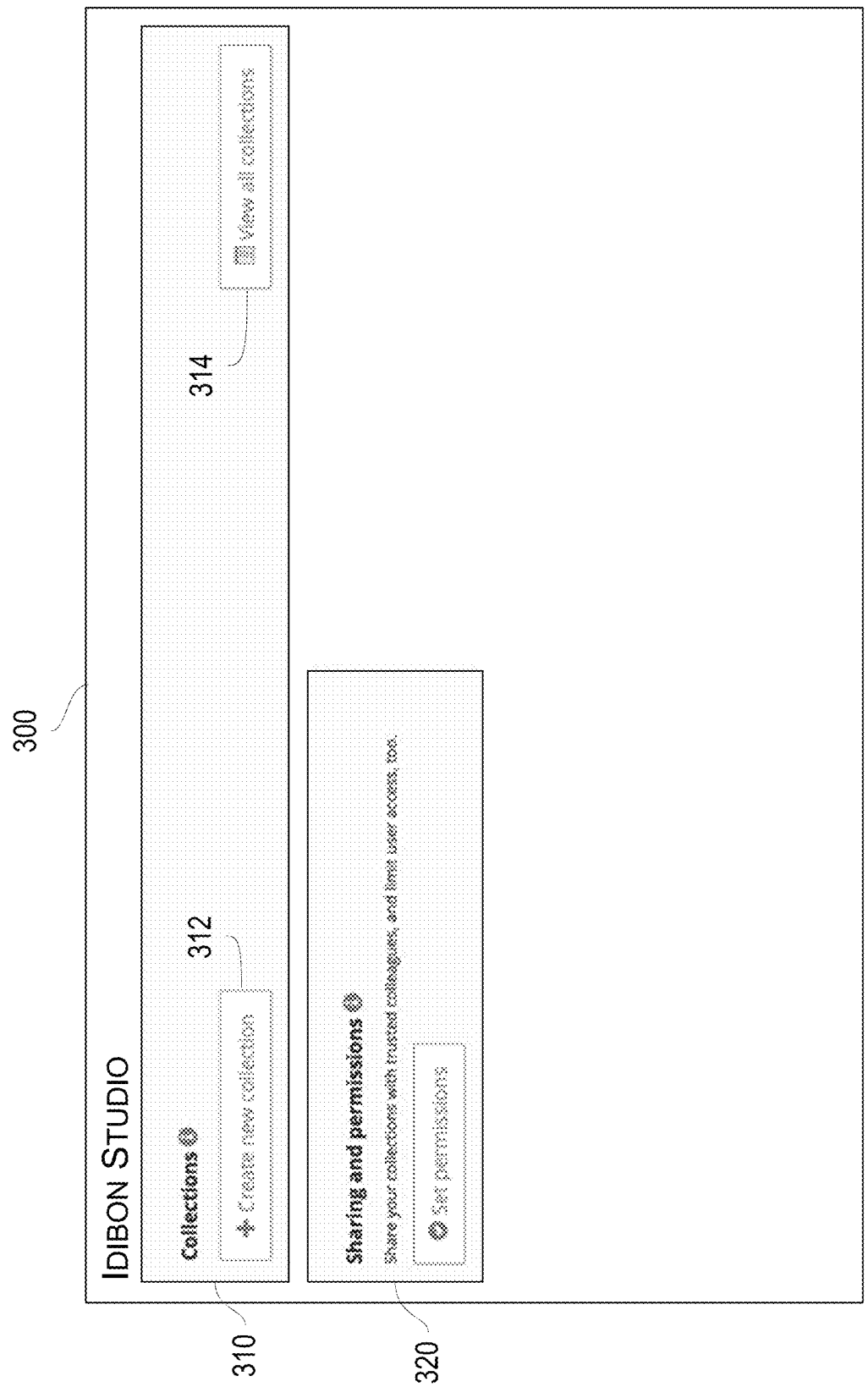
FIG. 3 illustrates a sample interface display of a first GUI accessing a collection of documents, according to some embodiments.

To more fully describe the capabilities and structures displayed on a first GUI 212 as described in FIG. 2, FIG. 3 illustrates an example embodiment for a control page 300 displayed to a project manager or other user of first GUI 212. In some embodiments, control page 300 is displayed after a project manager or similar user has accessed a system operating the natural language modeling engine, such as the one described in FIG. 2, with a login credential identifying the user as a project manager or other similar role for managing collections. In some embodiments, control page 300 displays a collections pane 310 and a sharing and permissions pane 320.

Collections pane 310 permits a user of first GUI 212 to create a new project for analyzing a collection of documents in a natural language modeling engine by engaging a create new collection action 312, or access previous projects by engaging a view all collections action 314. In some embodiments, sharing and permissions pane 320 permits a user of first GUI 212 to allow other users, such as user 132 or user 152 to access any analytical information of a collection of documents managed by a project manager.

Figure 4:
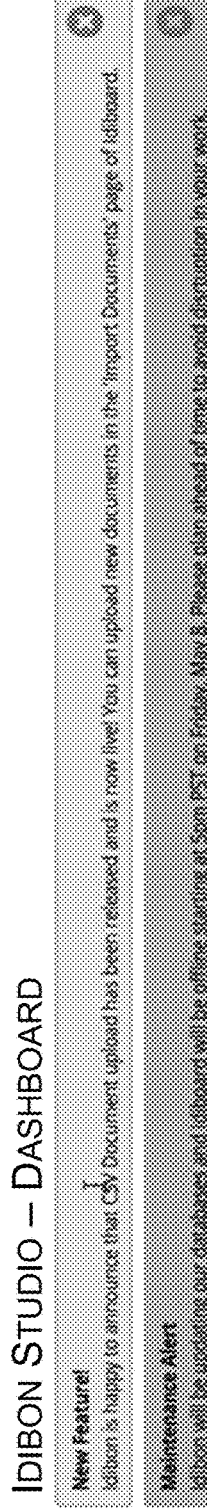
FIG. 4 illustrates a sample interface display of a first GUI presenting a landing page for a user of a first GUI to access features and maintenance, information of a collection of documents to a user, and annotation assignments according to some embodiments.

FIG. 4 illustrates an example embodiment of dashboard 400 that is presented to a user after accessing the natural language modeling engine, such as the one described in FIG. 2. In some embodiments, dashboard 400 directs a user to updates to, and new features provided by, the natural language engine model in a features pane 410 to keep first GUI functioning with the latest operational capabilities. Dashboard 400 in some embodiments includes a maintenance pane 412 to identify system services or other alerts, such as the availability of the natural language modeling engine.

In some embodiments, dashboard 400 includes a current projects pane 420. Current projects pane 420 is configured to display a variety of information about projects the user accessing dashboard 400 is managing or has permissions to view, such as model accuracy of a particular project of a collection of documents, the number of annotations outstanding for that particular project, or the topics and labels and tasks of the particular project. Current projects pane 420, in some embodiments, includes a view all projects action button to view more projects within current projects pane 420, or a create new topic action button to direct the user to a topic creation series of displays described more fully below.

In some embodiments, dashboard 400 further includes annotation pane 430 for the user of first GUI 212 to access a series of work unit interfaces created for annotating. In some embodiments, dashboard 400 is displayed on second GUI 214 or third GUI 216 as described in FIG. 2 and displays annotation pane 430 to those respective users for accessing documents for annotation by the respective user. Dashboard 400, in some embodiments, recognizes an expert annotator or annotator from a login credential and directs the expert annotator or annotator to the annotations pane 430 for annotating documents through their respective work unit interfaces.

Figure 5:
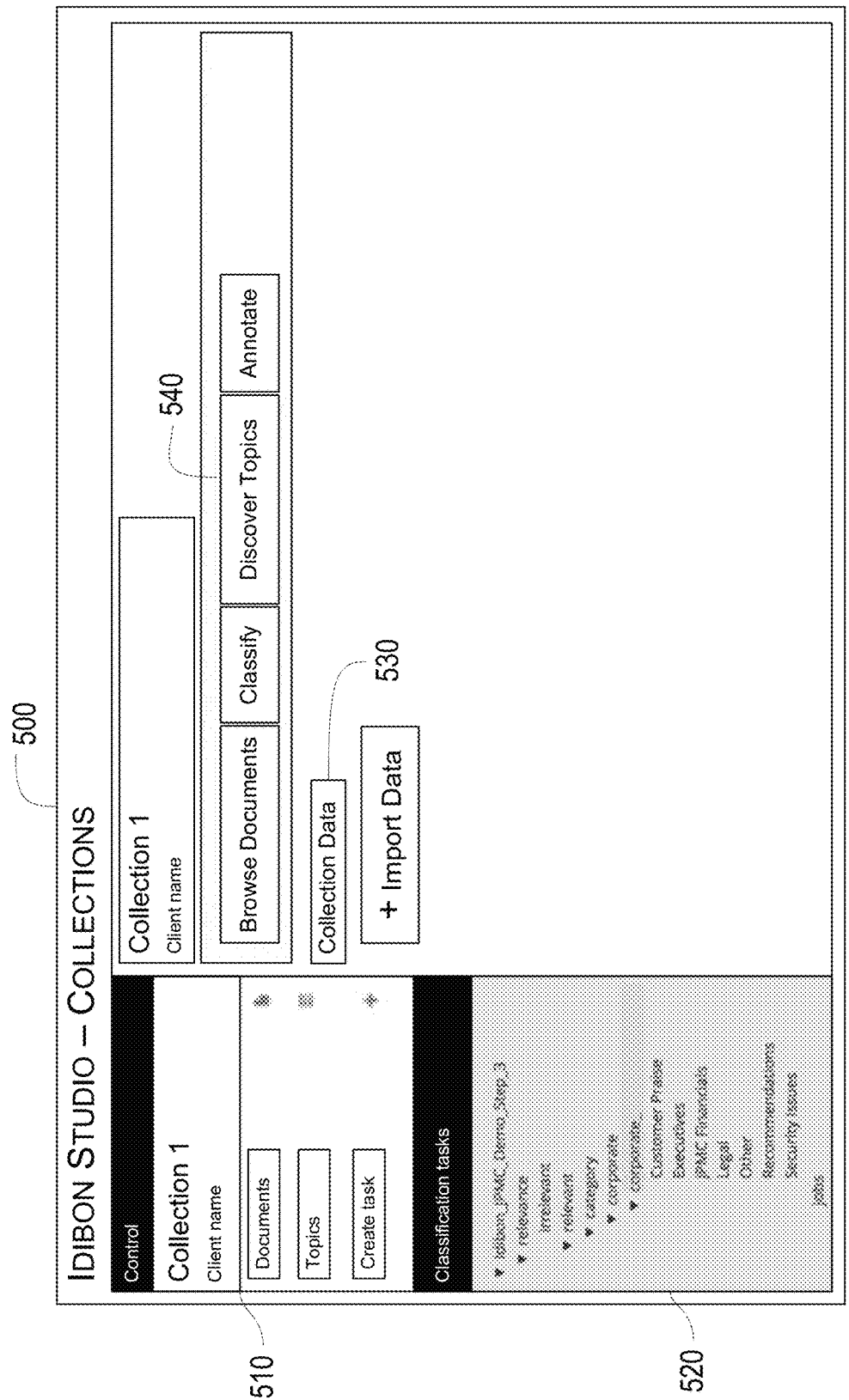
FIG. 5 illustrates a sample interface display of a first GUI for accessing a plurality of documents to create a collection of documents, according to some embodiments.

FIG. 5 illustrates a sample display for initiating the creation of an ontology from a collection of documents. Collection pane 500 is displayed on first GUI 212 and comprises a client pane 510, classification pane 520, and collection data pane 530. In some embodiments, client pane 510 includes a document action button, a topic action button, and create task button. A document action button permits a user of first GUI 212 to access the documents within a collection associated with a particular client, such as a customer that has uploaded documents to the natural language modeling engine. A topic action button permits a user of first GUI 212 to view alternative or additional topics in a collection to allow additional ontologies for those topics as necessary or determined by the user of first GUI 212. A create task button permits a user of first GUI 212 to add labels or tasks to an ontology in addition to any that may have been created by a natural language modeling engine.

In some embodiments, classification pane 520 is displayed to the user on collection pane 500 to display a suggested ontology based on previous ontologies and collections the user of first GUI 212 has used. In some embodiments, classification pane 520 is populated with other labels and tasks associated with a particular client as identified in client pane 510. For example, if a particular client as identified through client pane 510 by a natural language modeling engine has historically and consistently used certain labels and tasks for categorizing a collection of documents, the natural language modeling engine can build a new ontology with those historic labels and tasks for a new collection of documents and display the resulting ontology in classification pane 520.

In some embodiments, collection data pane 530 displays documents that are part of a collection to be analyzed. In some embodiments, and as depicted in FIG. 5, collection data pane 530 includes an import data action button to initiate access to a collection of documents, such as a collection provided by a client or customer, for analysis. In some embodiments, classification pane 520 displays an ontology reactive to the documents present in collection data pane 530, such that an ontology is created or previous ontologies are updated as documents accessed through collection data pane 530 are interfaced with and annotated.

Figure 6:
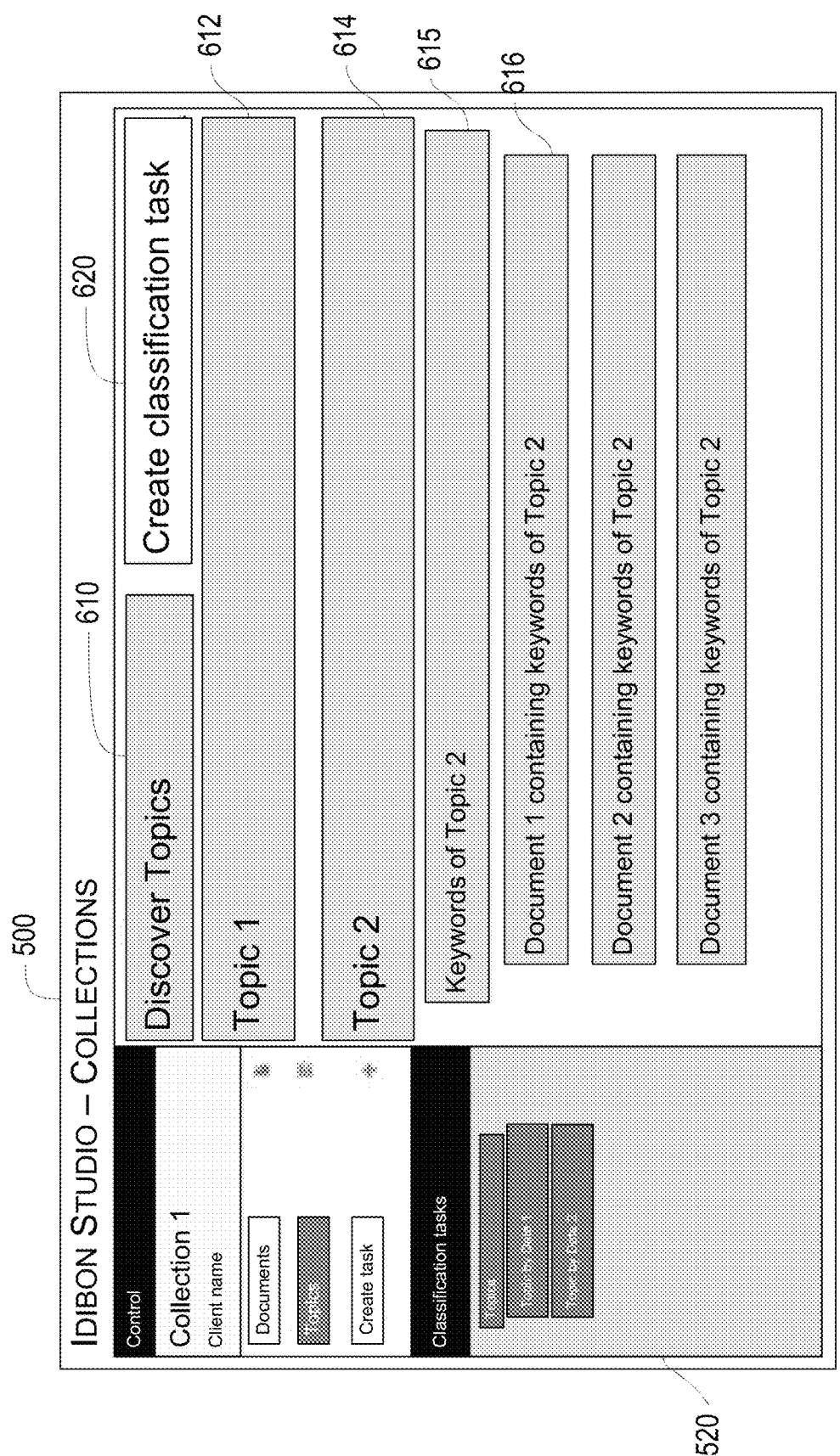
FIG. 6 illustrates a sample interface display of a first GUI for reviewing automatic topic modeling incident to an ontology of a collection of documents based on keywords within the collection, according to some embodiments.

In some embodiments, collections pane 500 includes a discover topics action button 540 to initiate an automatic construction of an ontology through a discover topics interface more fully described in conjunction with FIG. 6.

FIG. 6 illustrates a collection pane 500 configured to display a discover topic action button 610. In some embodiments, discover topic action button 610 prompts a natural language modeling engine to analyze the collection of documents accessed by first GUI 212, such as through collections data pane 530 as described in FIG. 5, for common themes and keywords. In some embodiments, a first topic suggestion 612 is displayed in collection pane 500 on first GUI 212 with second topic suggestion 614, though many other iterations and numbers of topic suggestions are possible. As an illustrative example, for a collection of documents accessed by first GUI 212 there may be a large number of documents with the word "horse" and a large number of documents with the word "betting." Engaging discover topic action button 610 can prompt the natural language modeling engine to form a first topic and ontology around the word "horse" and sub labels and tasks such as "breed," "positive," "diet" and a second topic and ontology around the word "betting" with sub labels and tasks such as "owner" and "race dates."

In some embodiments, a topic suggestion includes further displays of the keywords identified to justify the creation of the topic suggestion. For example, as depicted in FIG. 6., keywords pane 615 displays at least one keyword recognized through a plurality of the documents in a collection and in some embodiments, a plurality of documents 616 containing that keyword is further displayed in collection pane 500. In some embodiments, classification pane 520 is configured to display the suggested topics 612 and 614 and keywords 615 as an ontology; that is, the suggested topics 612 and keywords 615 can be used in some embodiments as the label and tasks for a collection of documents to create an ontology displayed in classification pane 520. A user of first GUI 212 can review the suggested topics, and select which set of keywords identified by the natural language modeling engine best reflect the needs of the project and thereby select a topic for building an ontology to display in classification pane 520.

By presenting the documents associated with a keyword, through a plurality of documents 616, a user of first GUI 212 can see how the keywords are used to further gauge the context of the keywords and not simply the presence of the word before choosing a topic and building an ontology. For example, using the above "horse" and "betting" topics; if the keyword for a document is "race" or "bet," and plurality of documents 616 displays advertisements for stables with the lines, "You will race over to get a stall in our stable," or "You can bet your family will love our horses," a user of first GUI 212 can determine those documents are not truly indicative of racing or betting and remove them from the ontology, or decide to choose another topic that may have plurality of documents 616 more inline with the desired keywords.

In some embodiments, keywords 615 are identified independently of topic suggestion 612 or 614. In other words, an ontology is created around keywords 615 without a threshold topic to group those keywords under. In some embodiments, each keyword within keywords 615 is a label or task for an ontology. For example, to use the "horse" and "betting" examples from above, rather than categorizing a collection of documents that may have the words "horse" and "betting" within them into distinct topics with keywords directed to those particular words, a natural language modeling engine can create an ontology from only the keywords. In these embodiments, labels such as "relevant" or "irrelevant" may be more important to distinguish which documents are applicable for a label or task, as a threshold topic selection may not have filtered these documents.

Figure 7A:
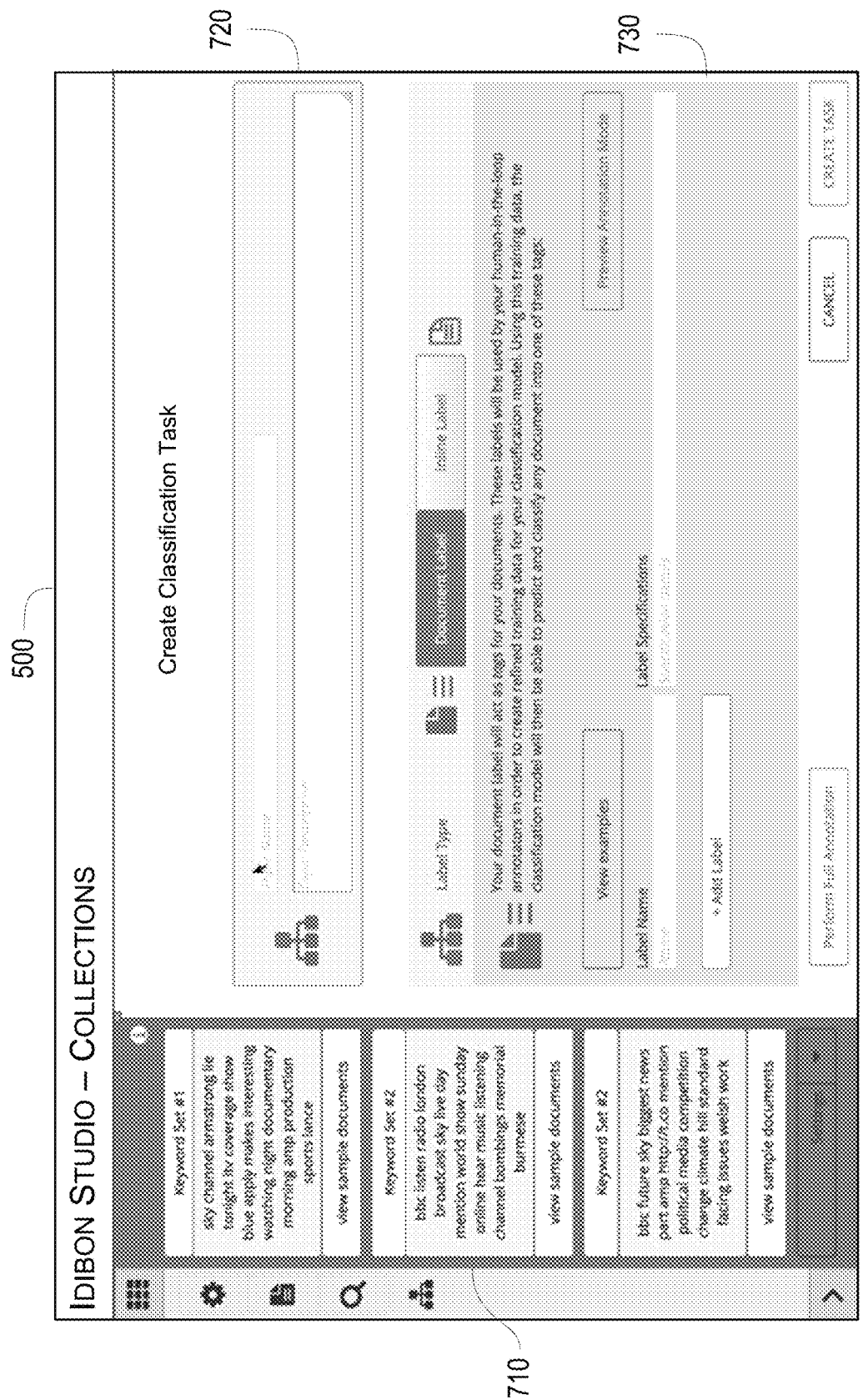
FIG. 7A illustrates a sample interface display of a first GUI for creating an ontology of a collection of documents based on keywords entered into the interface, according to some embodiments.

As depicted in FIG. 7A, in some embodiments, the user of a first GUI 212 can create an ontology independently through a create classification task pane 720 displayed in collection pane 500 on a first user GUI 212. These embodiments represent additional ways to create an ontology without a specific topic selection. In some embodiments, first GUI 212 automatically discovers suggested topics, such as suggested topics 612 and 614 depicted in FIG. 6, and displays a keywords suggestion pane 710 populated with keyword sets identified across those topics. Keyword suggestion pane 710 can determine keywords much in the same way as described in FIG. 6 by recognizing common words and identifying major themes across a collection of documents. From create classification task pane 720, the user of first GUI 212 has more autonomy in applying those keywords to create an ontology. Keywords suggestion pane 710 can allow the user to quickly assess the correlation among the keyword set, the context, presence of slang, and other subjective factors to create an appropriate topic around.

In some embodiments, a topic label pane 730 is further presented in collection pane 500 to receive a user's specific input for the labels and tasks to a collection of documents. For example, though keywords can be readily used for labels or tasks, a user of first GUI may have specific labels in mind for an ontology and can direct a natural language modeling engine to build an ontology on those directed labels. In those embodiments, non-intuitive relationships can be constructed that artificial intelligence may not yet be programmed for or experienced enough to identify on its own.

In some embodiments, once the ontology is created, either by the natural language modeling engine discover topics function described above or by the create classification task function dictated by the user of a first GUI as described above, certain documents are selected for annotation to confirm the accuracy of the placement of the document within a label of the ontology. In some embodiments, the natural language modeling engine cannot determine which label(s) are applicable to a document and does not know where to place a particular document into the ontology and selected the document for annotation. In some embodiments, a natural language modeling engine selects documents for verification of placement, despite a high likelihood of successful categorization. In some embodiments, the natural language modeling engine constructs a work unit interface to efficiently receive annotations for such verification or placement.

Figure 7B:
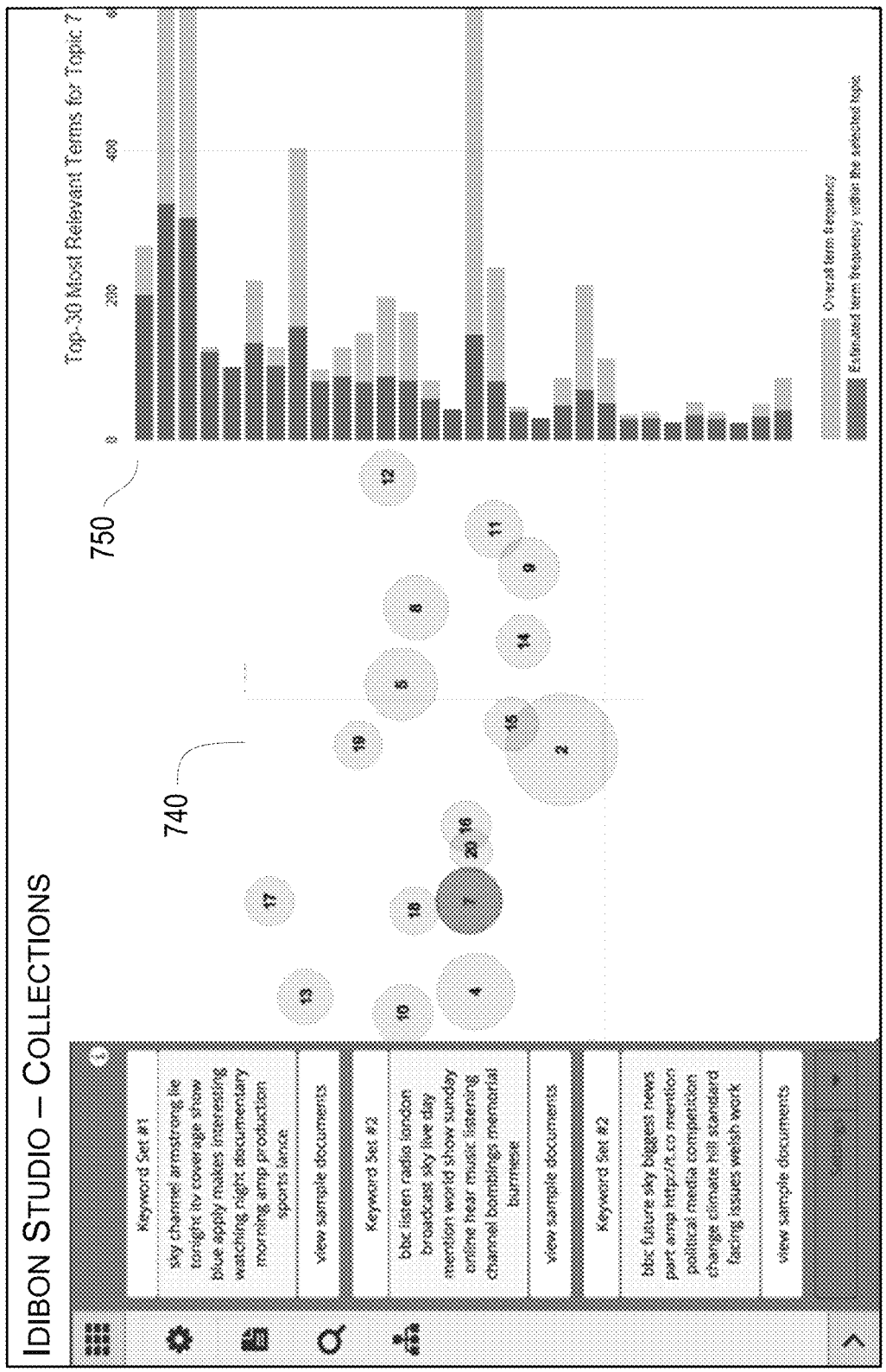
FIG. 7B illustrates a sample interface display of a first GUI for visually presenting topic relevance and relationship to other topics, according to some embodiments.

As depicted in FIG. 7B, in some embodiments, keyword suggestion pane 710 is a visual presentation rather than a purely textual list of keywords. In some embodiments, keyword suggestion pane 710 is accompanied by topic circle graph 740 displaying possible topics based on a number of keywords supporting a topic. For example, a topic with more keywords related to it is displayed as a larger topic circle. Additionally, in topic circle graph 740 the relation between topics is visually displayed. In some embodiments, topics with more keywords in common with another topic are displayed closer together on topic circle graph 740.

In some embodiments, relevant terms window 750 displays keywords across the collection of documents. In some embodiments, the frequency of a particular keyword within a topic selected by a user in topic circle graph 740 is displayed in relevant terms window 750 with a comparison for how frequently that keyword appears in other documents across the collection. For example, if the word "banking" appears four hundred times across a collection of documents, and four hundred times in a particular topic a user could readily deduce that "banking" is very relevant to the collection of documents and that an ontology for the collection of documents should include the word "banking."

Figure 8A:
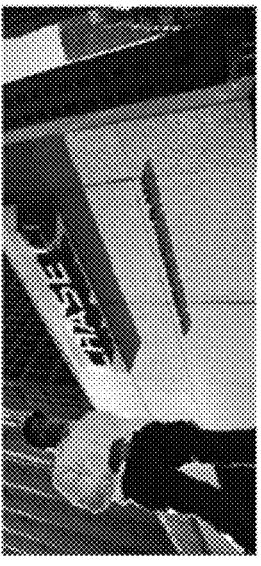
FIG. 8A illustrates a sample work unit interface arrangement of panes for collecting annotations from an expert annotator, according to some embodiments.

FIG. 8A depicts an example expert annotator work unit interface 800 as presented on a second GUI 214 constructed by a natural language modeling engine. In some embodiments, work unit interface 800 comprises a document pane 810, a prompt pane 820, label pane 830 comprising at least one label or task, reference button 835 paired to a label or task within label pane 830, create label pane 840 and create guideline pane 845.

In some embodiments, expert annotator work unit interface 800 is presented on second GUI 214 upon a user logging into a natural language modeling engine with an expert login credential. As described in FIG. 4 and annotation pane 430, second GUI 214 may display an annotation pane 430 directing the user to expert annotator work unit interface 800 for annotations from the user operating second GUI 214. Expert annotator work unit interface 800 is constructed by a natural language modeling engine displaying in document pane 810 a document from the ontology to be annotated, and listing at least one label or task from the ontology in label pane 830. In some embodiments, natural language modeling engine accesses a database of guidelines defining or otherwise describing the label or task displayed in label pane 830 and pairs the guideline with the respective label or task. In some embodiments, reference button 835 is a link to the guideline paired with a label or task in label pane 830. The function of a reference button is further described in conjunction with FIG. 8C.

In some embodiments, the intelligent queuing module of natural language modeling engine 210, such as the one described in FIG. 2, generates a human readable prompt to elicit a label or task selection by a user of expert annotator work unit interface 800. Examples of such human readable prompt include, but are not limited to, "select the best label for the document" from a plurality of labels in label pane 830, "select all labels that apply to the document" from a plurality of labels in label pane 830, "rank the labels in order of relevance" from a plurality of labels in label pane 830, or binary response prompts such as "does this label apply to the document?" with yes and no labels in label pane 830. One of skill in the art can imagine a multitude of applicable human readable prompts. The human readable prompts are not necessarily identical across all work unit interfaces displaying the same document. In some embodiments, work unit interface 800 displays document 810' in the document pane 810 and prompt 820' in prompt pane 820. In other embodiments, work unit interface 800 displays document 810' in the document pane 810 and prompt 820" in prompt pane 820. By using different prompts for the same document, natural language modeling engine can still collect annotations from the work unit interface 800 but have a more diverse basis for aggregation information to a label.

In some embodiments, human readable prompt 820 elicits the selection or categorization of portions of text displayed in document pane 810. Examples of such prompts include, but are not limited to, "select all examples of each label within the document" with a list of labels in label pane 830 and "is the highlighted section of the document an example of this label?" with yes and no labels in label pane 830. In some embodiments, work unit interface 800 displays document 810' in document pane 810 with a plurality of example regions of text visually distinguished from the rest of the document to assist the annotator. In some embodiments, the example regions of text are created using the API module of natural language modeling engine 210. Examples of visual representations for example regions include, but are not limited to, using unique background colors around the example region to highlight the text, and underlining the example text regions. In some embodiments, the example region is distinguished with variable degrees of visual representation to reflect a natural language modeling engine's confidence in selecting an example region as a correct example of a label or task. For example, in some embodiments, a thicker underlined example region indicates stronger confidence as opposed to a thinner underlined example region, or an opaque highlighted background color as opposed to a semi-transparent background color.

In some embodiments, prompt pane 820 is populated with the generated human readable prompt. In some embodiments, expert annotator work unit interface 800 permits the user of second GUI 214 to populate create label pane 840 with a new label. Expert annotators creating new labels for documents can distinguish certain nuances in documents that normal annotators or a natural language modeling engine cannot, such as legal interpretations or advanced sciences that may have distinct meanings in a particular field. By entering a new label or task into create label pane 840, the expert annotator can update other work unit interfaces with the created labels the expert annotator has identified, and update an ontology with more accurate categorizations. Similarly, in some embodiments, expert annotator work unit interface 800 includes a create guideline pane 845 permitting the user of second GUI 214 to populate create label pane 845 with a revised guideline to pair with a particular label to provide more descriptive information to help other expert annotators or other annotators interpret the applicability of a label or task rather than simply rely on the guideline provided by the natural language modeling engine. In some embodiments, create guideline pane 845 receives a "gold" designation from an expert annotator to indicate a particular label or task is particularly representative or a good example otherwise of the document or prompt displayed in a work unit interface. Such "gold" or similar exemplary marker is displayed in a work unit interface displayed to other expert annotators or annotators as a guideline explained more fully as 890 in describing FIG. 8C. Such designations indicate not only that an expert annotator wants to draw attention to a particular label or task, but can also be used to train other expert annotators or annotators to what the particular label or task should be representing.

In some embodiments, an annotation of a document is made on expert annotator work unit interface 800 by selecting a label or task displayed in label pane 830 and the annotation is recorded by a natural language modeling engine.

In some embodiments, subsequent to selection of a label displayed in label pane 830, work unit interface 800 immediately displays an additional human readable prompt in prompt pane 820 and populates at least one subsequent label in label pane 830 responsive to the earlier label selection of the first human readable prompt. For example, if the expert annotator answers "Yes" to a first human readable prompt about document relevance, prompt pane 820 may immediately display an additional human readable prompt requesting the best label for the document. By contrast, if the expert annotator answers "No" to the first prompt, an additional human readable prompt is not displayed.

In some embodiments, the additional human readable prompt created for prompt pane 820 matches the ontology structure displayed in classification tasks pane 520. In such embodiments, annotations of a document are made for all labels and tasks in an ontology by selecting a label or task in label pane 830 for each additional human readable prompt.

FIG. 8B illustrates an embodiment of an annotator work unit interface 850 as displayed on a third GUI 216. In some embodiments, annotator work unit interface 800 is presented on third GUI 216 upon a user logging into a natural language modeling engine with an annotator login credential. As described in FIG. 4 and annotation pane 430, third GUI 216 may display an annotation pane 430 directing the user to annotator work unit interface 850 for annotations from the annotator operating third GUI 216. Annotator work unit interface 850 is constructed by displaying in document pane 860 a document from the ontology to be annotated, and listing at least one label or task from the ontology in label pane 880. In some embodiments, natural language modeling engine accesses a database of guidelines defining or otherwise describing the label or task displayed in label pane 880 and pairs the guideline with the respective label or task. In some embodiments, reference button 885 is a link to the guideline paired with a label or task to present to the annotator on third GUI 216 the definition of the particular paired label or task in label pane 880. The function of a reference button is further described in conjunction with FIG. 8C.

In some embodiments, the intelligent queuing module of natural language modeling engine 210, such as the one described in FIG. 2, generates a human readable prompt to elicit a label or task selection by a user of annotator work unit interface 850. Examples of such human readable prompt include, but are not limited to, "select the best label for the document" from a plurality of label panes 880, "select all labels that apply to the document" from a plurality of label panes 880, "rank the labels in order of relevance" from a plurality of label panes 880, or binary response prompts such as "does this label apply to the document?" with yes and no label panes 880. One of skill in the art can imagine a multitude of applicable human readable prompts. The description of prompt pane 820 in describing expert annotator work unit interface 800 is applicable in the various prompts possible in describing prompt pane 870. In some embodiments, prompt pane 870 of annotator work unit interface 850 is populated with the generated human readable prompt.

In some embodiments, human readable prompt 870 elicits the selection or categorization of portions of text displayed in document pane 860. Examples of such prompts include, but are not limited to, "select all examples of each label within the document" with a list of labels in label pane 880 and "is the highlighted section of the document an example of this label?" with yes and no labels in label pane 880. In some embodiments, work unit interface 850 displays document 860' in document pane 860 with a plurality of example regions of text visually distinguished from the rest of the document to assist the annotator. In some embodiments, the example regions of text are created using the API module of natural language modeling engine 210. Examples of visual representations for example regions include, but are not limited to, using unique background colors around the example region to highlight the text, and underlining the example text regions. In some embodiments, the example region is distinguished with variable degrees of visual representation to reflect a natural language modeling engine's confidence in selecting an example region as a correct example of a label or task. For example, in some embodiments, a thicker underlined example region indicates stronger confidence as opposed to a thinner underlined example region, or an opaque highlighted background color as opposed to a semi-transparent background color.

In some embodiments, an annotation of a document is made on annotator work unit interface 850 by selecting a label or task displayed in at least one label pane 880 and the annotation is recorded by a natural language modeling engine.

In some embodiments, subsequent to selection of a label displayed in label pane 880, work unit interface 850 immediately displays an additional human readable prompt in prompt pane 870 and populates at least one subsequent label in label pane 880 responsive to the earlier label selection of the first human readable prompt. For example, if the annotator answers "Yes" to a first human readable prompt about document relevance, prompt pane 870 may immediately display an additional human readable prompt requesting the best label for the document. By contrast, if the annotator answers "No" to the first prompt, an additional human readable prompt is not displayed.

In some embodiments, the additional human readable prompt created for prompt pane 870 matches the ontology structure displayed in classification tasks pane 520. In such embodiments, annotations of a document are made for all labels and tasks in an ontology by selecting a label or task in label pane 880 for each additional human readable prompt.

Figure 8C:
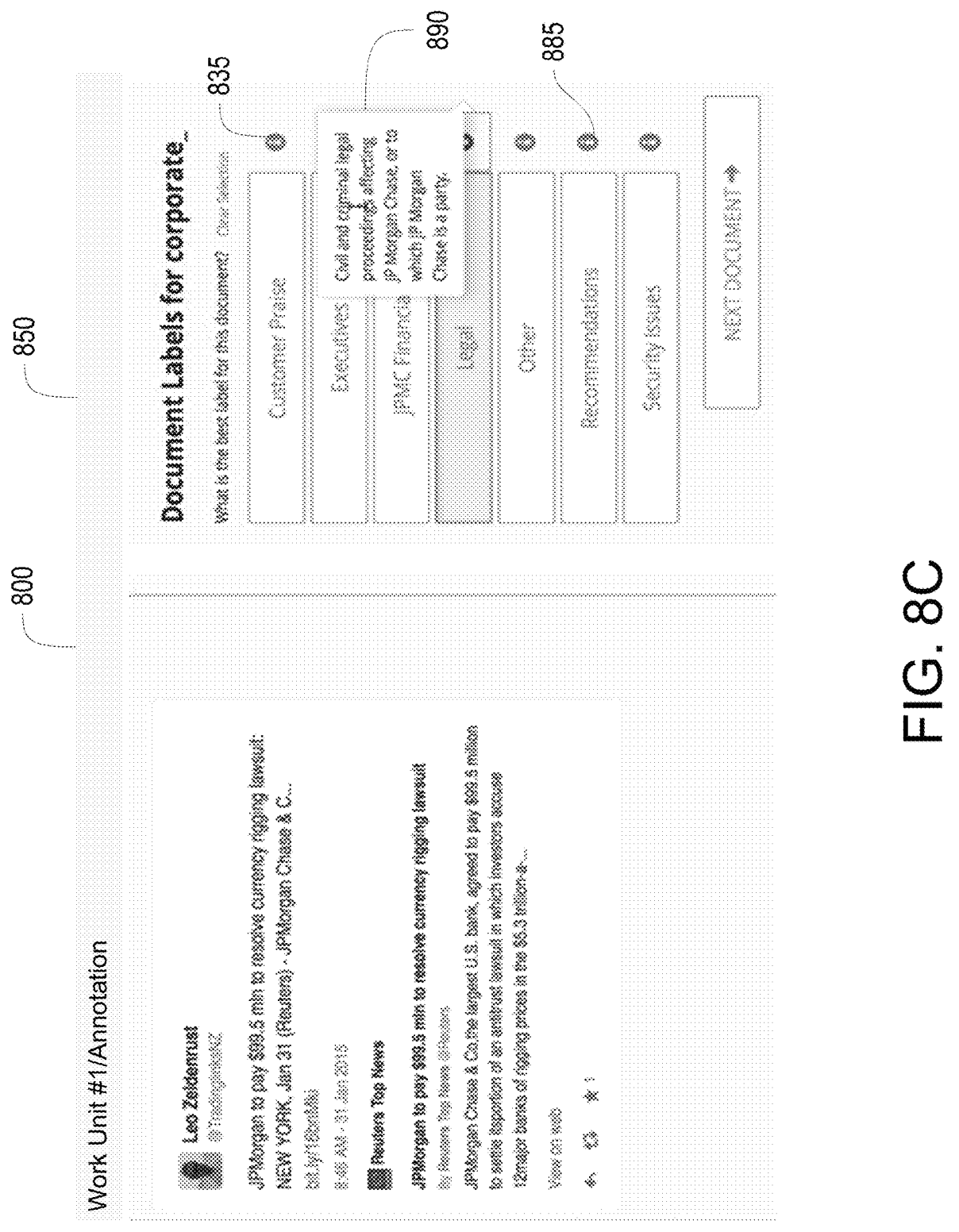

FIG. 8C illustrates a reference button function on either an expert annotator work unit interface 800 or annotator work unit interface 850 and the respective reference button 835 or reference button 885. Upon selection by a user of second GUI 214 or third GUI 216 of reference button 835 or reference button 885 respectively, guideline 890 is displayed within the work unit interface. In some embodiments, the guideline 890 displayed is the guideline accessed from a database of a natural language modeling engine for a particular label; in some embodiments the guideline 890 displayed is the revised guideline as created by an expert annotator through expert annotation work unit interface 800 create guideline pane 845 on second GUI 214, and updated on all work unit interfaces present on GUIs within an interface system 200 such as one depicted in FIG. 2. In some embodiments, guideline 890 displays both the guideline accessed from a database of natural language modeling engine as well as the revised guideline, if any, created by the expert annotator.

In some embodiments, the annotations received on all work unit interfaces 800 and 850 are aggregated together by ontology the documents underlying the work unit interface were drawn from. In some embodiments, the aggregation occurs in an annotation module of a natural language modeling engine 210 and are shared on a first GUI 212 such as depicted in FIG. 2.

Figures 8D, 8E:
FIGS. 8D-E illustrates a sample work unit interface arrangement of panes for displaying annotating spans and selecting spans, according to some embodiments.

FIG. 8D illustrates a span annotation work unit interface interaction. In some embodiments, a work unit interface displays a document in a document pane and span prompt 891 in a prompt pane. In some embodiments, span prompt 891 is associated with span annotation 892 in a label pane. In some embodiments, a natural language modeling engine predicts spans of a document that represent a particular label or task and displays the predicted span as a highlighted text or underlined text 893 in the document displayed in the document pane of the work unit interface. One of skill in the art can appreciate other ways of visually distinguishing text for span annotation in a work unit interface. In some embodiments, an expert annotator or annotator annotates the span prediction with a span annotation 892 in the label pane.

In some embodiments, a span prompt 891 requests confirmation of multiple spans, such as "location" and "person" and a toggle or swatch or menu function in the document pane switches between the prompted spans and displays different highlighted or underlined text 893 corresponding to the span prompted in span prompt 891. For example, a span prompt requests confirmation of a document that the highlighted or underlined text represents "people" and "locations." An expert annotator or annotator selects a toggle, swatch, or menu function in the document pane for "locations" and the work unit interface displays those highlighted or underlined texts the natural language modeling engine has predicted correspond to "locations." The expert annotator or annotator then annotates with a span annotation 892 in the label pane and then presses the toggle, swatch, or menu function for "people" and the work unit interface displays those highlighted or underlined texts the natural language modeling engine has predicted correspond to "people." The expert annotator or annotator then annotates for "people" and the natural language modeling engine processes the span annotations.

FIG. 8E illustrate a span selection work unit interface. In some embodiments, span selection prompt 894 is displayed in a prompt pane of a work unit interface requesting an annotator highlight or underline or otherwise visually distinguish a span within a document pane. In some embodiments, an expert annotator or annotator annotates an otherwise unmarked document in a document pane by highlighting or otherwise visually distinguishing a span 895 within the document. In some embodiments, a natural language modeling engine predicts which span corresponds to requested label or task in span prompt 894 by visually distinguishing a span in a separate method than an expert annotator or annotator would. For example, for a span selection prompt 894 requesting a user select a span for "locations," a natural language modeling engine will instruct a work unit interface to present underlined spans 896 the natural language modeling engine predicts correspond to "locations," and an expert annotator or annotator can confirm the prediction by highlighting the underlined span or highlighting other spans to annotate the document.

Figure 9A:
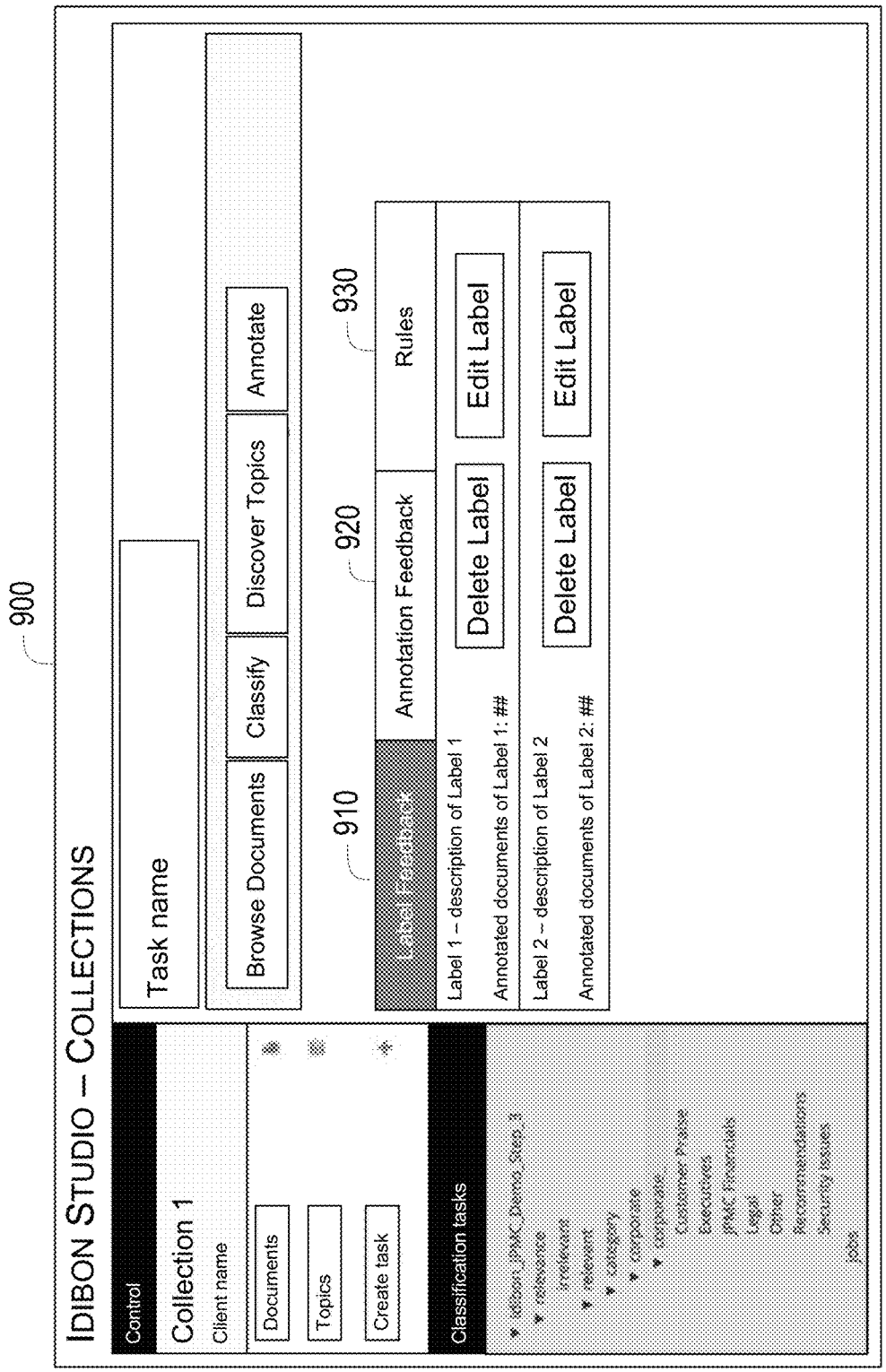
FIG. 9A illustrates a sample interface display of a label feedback pane within a first GUI for displaying characteristics of a label within an ontology, according to some embodiments.

FIG. 9A illustrates an annotation agreement interface 900 display on a first GUI 212 with a label feedback pane 910, annotation feedback pane 920, and rules pane 930. As further illustrated in FIG. 9A, in some embodiments, label feedback pane 910 includes a by label description of each label within an ontology with the number of annotations applied to the label and an option to delete or edit the label. From label feedback pane 910, a user of first GUI 212 can remove a label from an ontology if the annotation agreement for that label is low or the user of first GUI 212 determines it is not applicable to the ontology, or edit the label such as by reviewing a create label action as provided through a second GUI 214 and determining that label more applicable or descriptive. Similarly, the user of first GUI 212 can determine not enough annotations have been applied to the label to draw any conclusions from and decide to wait before making any adjustments to that label.

Figure 9B:
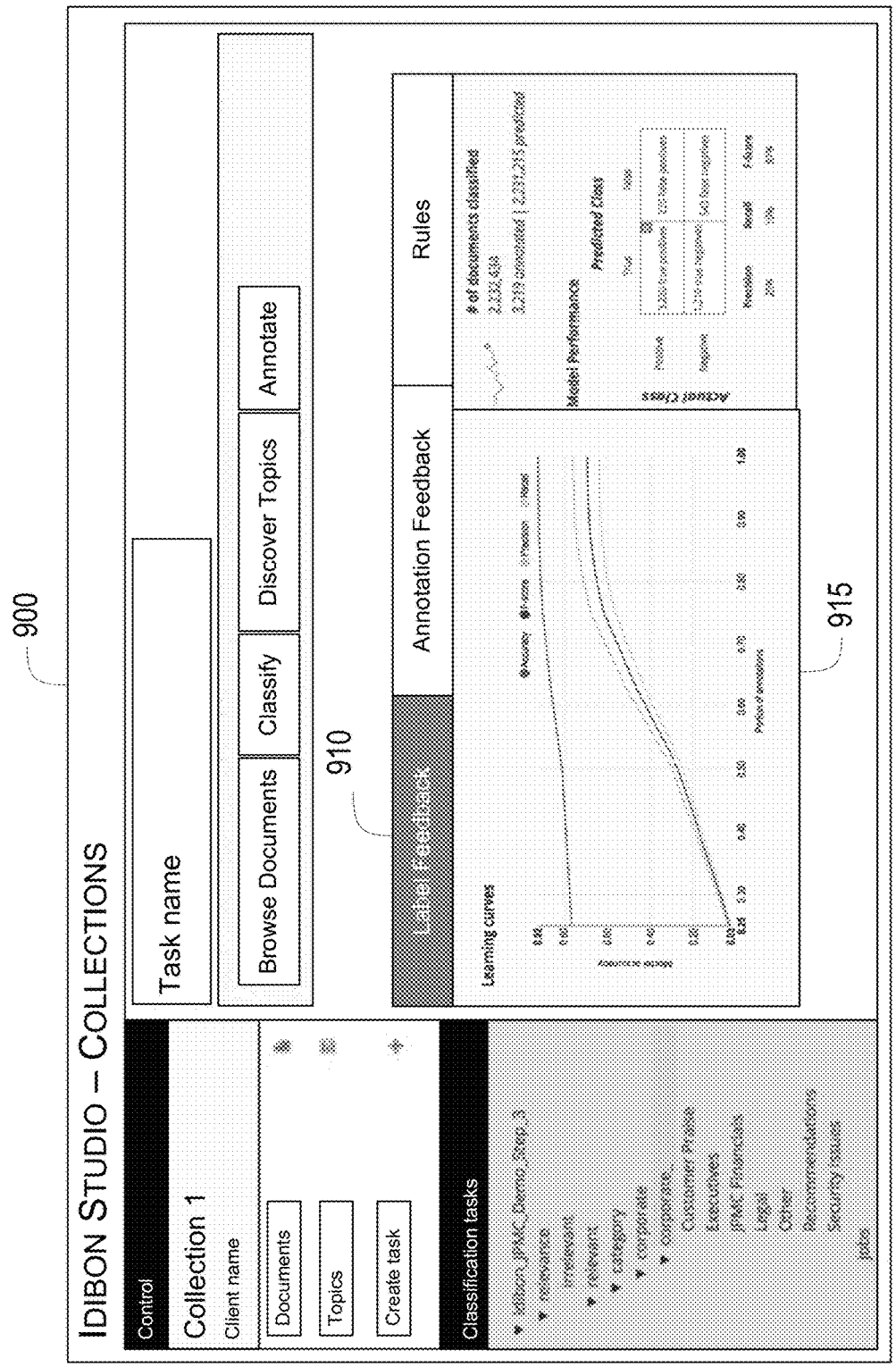
FIG. 9B illustrates a sample interface display of a label feedback pane within a first GUI for displaying a learning curve of the relationship between annotation agreement as a function of the number of annotations received, according to some embodiments.

FIG. 9B illustrates an example of a learning curve 915 within label feedback pane 910. In some embodiments, learning curve 915 is a graphical representation of the relationship between the number of annotations received for a particular label and the agreement between the annotations for the label. In some embodiments, learning curve 915 is a graphical representation of the relationship between the number of annotations received for a particular label and the accuracy of the natural language model generated for that label. Annotation agreement to a label, in some embodiments, is calculated by an annotations module of a natural language modeling engine, such as natural language modeling engine 210 as depicted in FIG. 2. In some embodiments, the annotation agreement is a number indicating the incidence rate of mutually agreed annotations among all annotators operating second GUIs 214 or third GUIs 216.

For example purposes only of one way to calculate an annotation agreement, if 10 annotators all annotated a document with a label of "positive" and 10 annotators did not annotate the same documents as "positive," then an annotation agreement of 0.50 or 50% would be reflected for the "positive" label or task of the document and learning curve 915 of those labels or tasks would depict the 0.50 or 50% agreement for 20 annotations. In the same example, if the next 20 annotators gave a "positive" annotation to the same document, the annotation agreement would update to 75% for a "positive" annotation for 40 forty annotations and learning curve 915 would graphically depict this relationship between annotation agreement as a function of the number annotations. One of skill in the art can appreciate other annotation agreement calculation methods.

In some embodiments, the accuracy of the natural language modeling engine in assigning documents to appropriate labels or tasks of an ontology is derived from cross-validation processes of the annotations used in a learning curve. In some embodiments, a modeling module of a natural language modeling engine, such as natural language modeling engine 210 as depicted in FIG. 2, performs cross-validation on the annotation dataset to determine ontology accuracy. One of skill in the art can appreciate applicable cross-validation techniques to apply to an annotation dataset such as exhaustive or non-exhaustive methods.

Figure 10A:
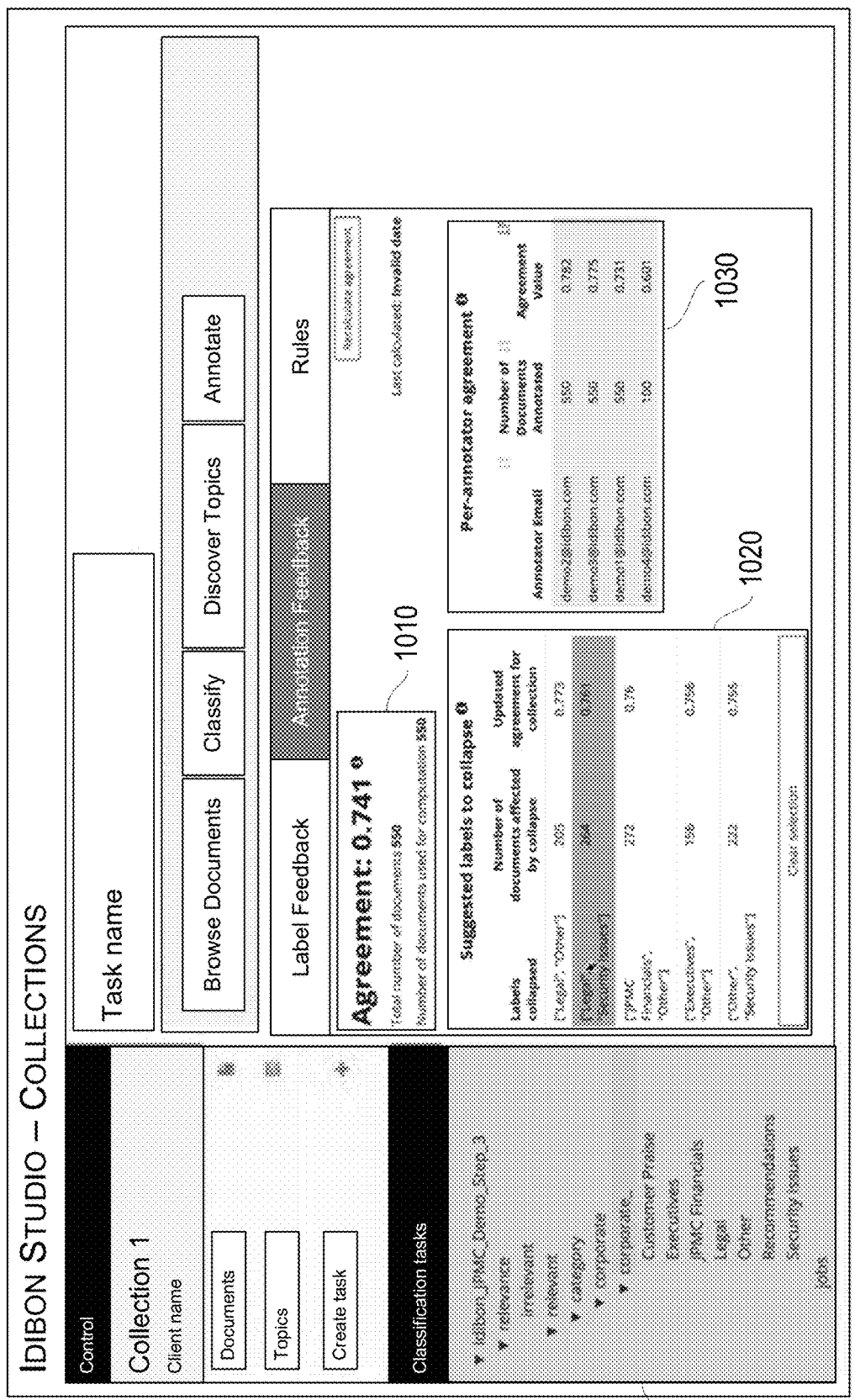
FIG. 10A illustrates a sample interface display of an annotation feedback pane within a first GUI for displaying annotation information relative to labels or tasks and annotators, according to some embodiments.

FIG. 10A illustrates an example display of an annotation feedback pane 920 with annotation agreement score 1010, individual annotator agreement list 1030, and suggested label collapse list 1020. In some embodiments, annotation agreement score 1010 displays an aggregate annotation agreement result as a proxy for the accuracy of an ontology. For example, in some embodiments, the annotation agreement score 1010 is determined by aggregating all annotations from second or third GUIs 214 or 216 for a particular set of documents that have been categorized into an ontology. Such an aggregation, in some embodiments, reflect the total annotation agreement of the whole ontology and give a project manager or other user of a first GUI 212 a rapid feedback mechanism of how well the natural language modeling engine categorized a collection of documents based on how human readers agreed a particular label or task applied to the same collection of documents. Such feedback confirmation can inform a project manager or other user of a first GUI 212 the degree of agreement among annotators on whether the labels or tasks presented on a work unit interface accurately reflected the document displayed on the work unit interface. For example, a low agreement score would indicate that the labels or tasks may have been too vague or inapplicable, and the annotators could not agree on whether, or which of, the labels presented in a label pane of applied to the document of the work unit interface and therefore, perhaps the natural language modeling engine did not have the most appropriate series of labels or tasks to categorize the ontology. By contrast, a higher agreement score could indicate the annotators found at least one label of a label pane was an accurate match to the document based on the generated prompt, and therefore the annotators found at least one the labels readily applied and the natural language modeling engine accurately captured the label or task of at least some documents.

In some embodiments, annotation agreement score 1010 can be broken down into a per label agreement, and in suggested label collapse list 1020 indicate which labels or tasks introduced higher disagreement among annotator and display the annotation agreement score that would result if certain labels or tasks were collapsed—or combined—with each other. For example, as depicted in FIG. 10A, the suggested label collapse list 1020 displays the resulting annotation agreement score 1010 of collapsing certain labels or tasks into one of several other labels or tasks of a hypothetical ontology (e.g. collapsing "Legal" with "Securities issues" and "JPMC Financial" with "Other"). In this example embodiment of FIG. 10A, collapsing "Legal" with "Other" results in an annotation agreement score 1010 of 0.773 as compared to an annotation agreement score 1010 of 0.741 if the two were separate labels or tasks. As this represents the largest increase annotation agreement score 1010 within the suggested label collapse list 1020, a user of first GUI 212 can readily deduce that annotators had a greater difficulty distinguishing "Legal" from "Other" than they did distinguishing any other two labels or tasks within the ontology. A user of first GUI 212 can make several other deductions from this information, such as whether the guideline describing "Legal" or "Other" sufficiently describes the label or task, or whether the prompt should be changed to permit more nuanced distinctions, or whether the ontology itself should not include a particular label or task.

In some embodiments an individual annotator agreement list 1030 displays how well a particular annotator within the aggregation of annotations agrees with other annotators. For example, as displayed in FIG. 10A, the annotator identified as "demo4" has an agreement value of 0.601, the lowest of the annotator group depicted in FIG. 10A, indicating that demo4 has a low incidence of agreeing with the other annotators (i.e. "demo1," "demo2," and "demo3") on a label or task as prompted in a work unit interface. As depicted in FIG. 10A, annotator demo4 also has only annotated 100 documents compared to the other annotators' 550. This display of information could suggest that annotator demo4 may need to be removed from the annotation group (for example, the subject matter confuses that annotator) to compute an annotation agreement score 1010 that reflects annotations with less annotators that may not understand the subject matter and could be giving false positives on applicable labels to a natural language modeling engine. This information could also be used to indicate annotator demo4 needs to be retrained on a particular subject matter depending on the degree of disagreement. For example, if annotator demo4 selected labels of "slightly positive" as compared to other annotators selecting "positive" then a user of GUI 212 could decide to retrain annotator demo4. However, if annotator demo4 selected labels of "very negative" as compared to other annotators selecting "very positive" then a user of GUI 212 could decide to remove annotator demo4 from the analysis. In other instances, a user of first GUI 212 could simply decide to wait for demo4 to annotate more documents to see if demo4's agreement value increases; such information can further be used to determine whether or not labels should be collapsed or if a project needs further annotation before drawing conclusions on the natural language modeling engine's accuracy.

Figure 10B:
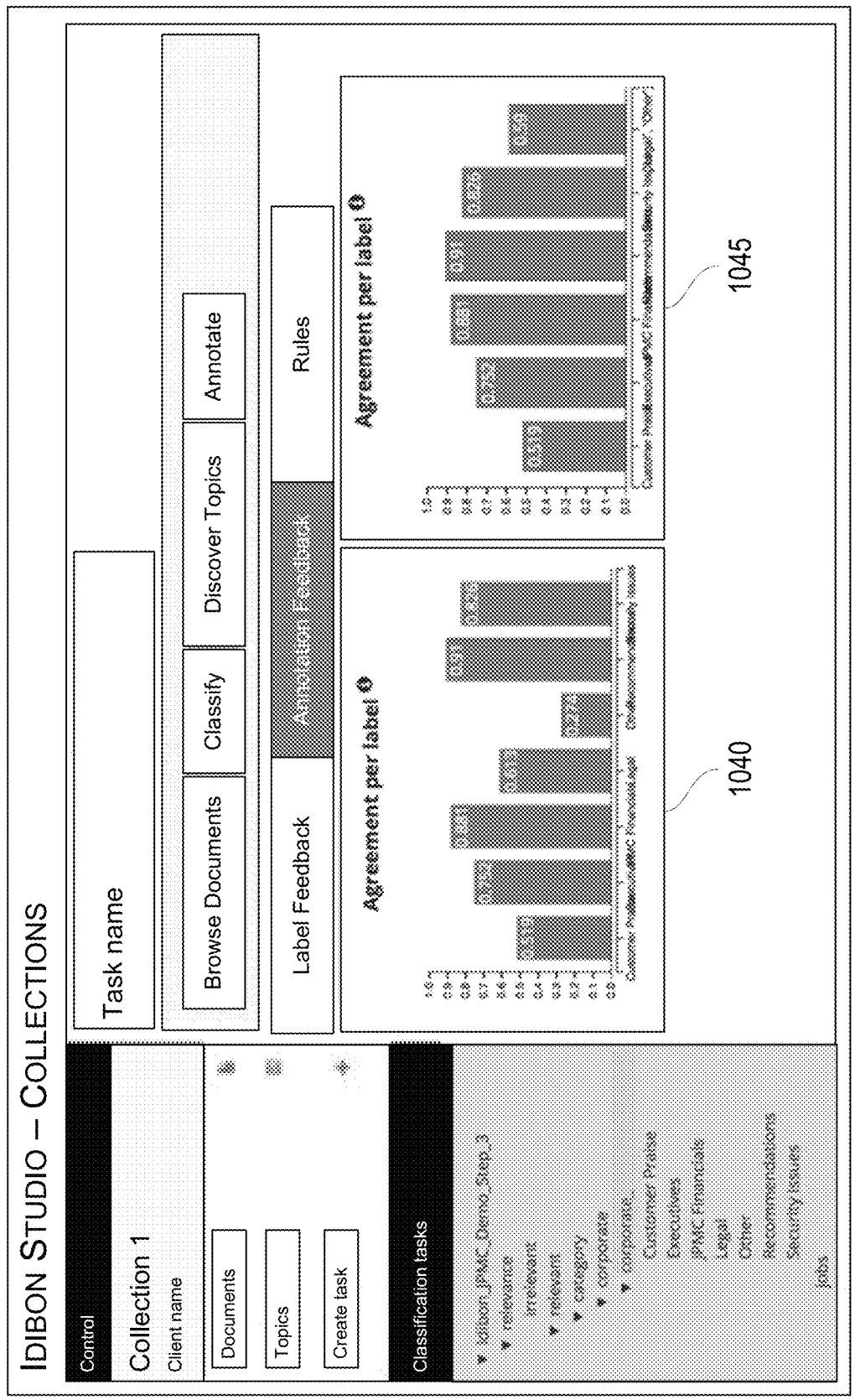
FIG. 10B illustrates a sample interface display of an annotation feedback pane within a first GUI for displaying graphical representations of annotation agreements relative to collapsing labels into one another, according to some embodiments.

FIG. 10B illustrates an agreement per label graphical representation 1040, and collapsed agreement per label graphical representation 1045. In some embodiments, agreement per label graphical representation 1040 displays individual annotation agreements by each label of an ontology, that, taken all together would comprise annotation agreement score 1010 as depicted in FIG. 10A. Breaking down the annotation agreements into a per label graphical representation informs a project manager or user of first GUI 212 which labels or tasks, relative to others, had the most agreement and can inform whether the label or task is likely an appropriate reflection of documents in a work unit interface.

In some embodiments, the annotation agreement interface includes a collapsed agreement per label graphical representation 1045 configured to display the per label annotation agreements if two or more labels were collapsed into one another. As illustrated for example purposes in FIG. 10B, collapsed agreement per label graphical representation 1045 indicates that by combining two labels with a respective agreement of 0.613 and 0.274 from agreement per label graphical representation 1040 into one another, a new agreement score of 0.59 results for that combined label in collapsed agreement per label graphical representation 1045 suggesting the annotation agreement score 1010 as illustrated in FIG. 10A will improve if these two labels are combined into one another, and enabling similar deductions by a project manager or user of first GUI 212 as described in connection with those functions of FIG. 10A.

FIG. 10C illustrates a per document agreement list 1050 within an annotation feedback pane 920. In some embodiments, a per document agreement list 1050 displays those documents within the ontology that have the highest agreement or lowest agreement among them. In some embodiments, the number of documents displayed in per document agreement list 1050 can be adjusted by a user of first GUI 212. In some embodiments, the per document agreement list 1050 displays those documents within a subset of label or task of an ontology with the highest or lowest agreement among annotators. By flagging the documents with the highest or lowest agreement in per document agreement list 1050, a user of first GUI 212 can choose to remove certain documents with low agreement to reduce the number of potentially vague or inapplicable documents within a collection (as indicated by not having strong human agreement on the applicable labels or tasks), or review the content of the particular document and label or task of a work unit interface displaying the document to determine whether the document contains a nuance that should be included as a new label or whether a guideline should be clarified to account for such nuances.

Figure 11:
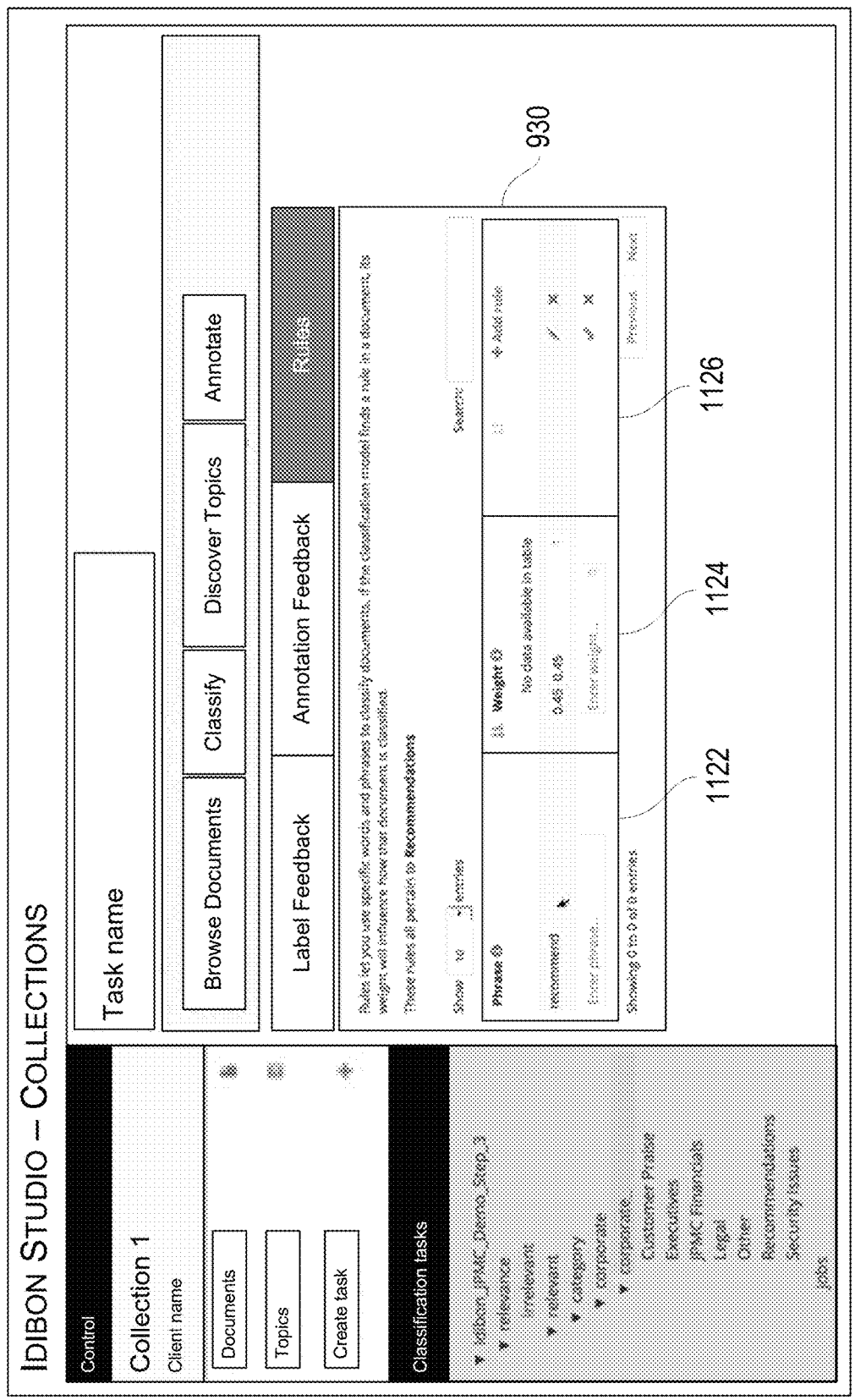
FIG. 11 illustrates a sample interface display of a rules feedback pane within a first GUI for displaying adjustment options to modeling and interpreting certain labels or tasks, according to some embodiments.

As depicted in FIG. 11, an annotation agreement interface can further display a rules pane 930 for adjusting any of the natural language modeling engine logic processes for certain inputs. In some embodiments, the rules pane comprises a phrase pane 1122 configured to display a data field for receiving a phrase or word that, if found within a document by a natural language modeling engine, will invoke a rule. In some embodiments, rules pane 930 displays a weighting adjustment pane 1124. In some embodiments, weighting adjustment pane 1124 is configured to receive from a user of first GUI 212 a manipulation to a certain phrase or word in phrase pane 1122 to emphasize or de-emphasize a certain word in placing a document in a label or task category of an ontology. For example, in an ontology with the word "recommend" as a label or task classification, a natural language modeling engine may categorize incidence of the word "recommend" as equivalent to "recommendation" without recognizing the context of the complete phrase or document "recommend" appears in, such as "does not recommend" which would not imply an positive recommendation. Weighting pane 1124 permits a user of first GUI 212 to reduce or increase the significance of certain words, thereby placing greater or less emphasis on other words in the document relative to the word or phrase in phase pane 1122. Such weighting can focus the ontology on which labels or tasks to create, or which documents should be selected for annotation. Continuing from the previous example, if a document includes the word "recommend" but that word has a low weighting and therefore the user of first GUI 212 does not consider it important, the natural language modeling engine may not select it for annotation to avoid using an annotator's time to accurately place a document with a low weighting.

In some embodiments, rules pane 930 includes add rule pane 1126. Add rule pane 1126 permits a user of first GUI 212, or in some embodiments an expert annotator operating second GUI 214, to create a rule for a particular phrase or word in phrase pane 1122. For example, if the word "recommend" appears in a document, add rule pane 1126 could be manipulated by receiving in a data field of add rule pane 1126 a rule such as "if this then that" logic rules, or rules to search for additional words surrounding a word in a phrase pane 1122. To continue the previous example, add rule pane 1126 could receive a rule to search for preceding words such as "no," "does not," "isn't," or other similar negative implicative words such that if "recommend" is paired with such a negative implicative word, the natural language modeling engine will not categorize the document as an affirmative "recommendation."

Taken together, a label feedback pane 910, annotation feedback pane 920, and rules pane 930 of an annotation agreement interface of a first GUI 212 permits rapid analysis of an ontology that has been annotated through second and third GUIs 214 and 216. Annotation agreement interface 900 further provides access to a variety of tools to determine where an ontology and its attendant labels or tasks can be refined to more accurately determine the underlying meaning of a collection of documents or store information for future ontologies to learn from. For example, if a revised guideline for a label results in an improved annotation agreement score 1010 of an ontology, the natural language modeling engine can store that revised guideline in a database and used that guideline for future ontologies that use the same label or task the revised guideline is describing. The wealth of information and deductions possible from human annotations to computer analysis tools and the insights such annotations provide can greatly improve mass classification of human communications.

Figure 12:
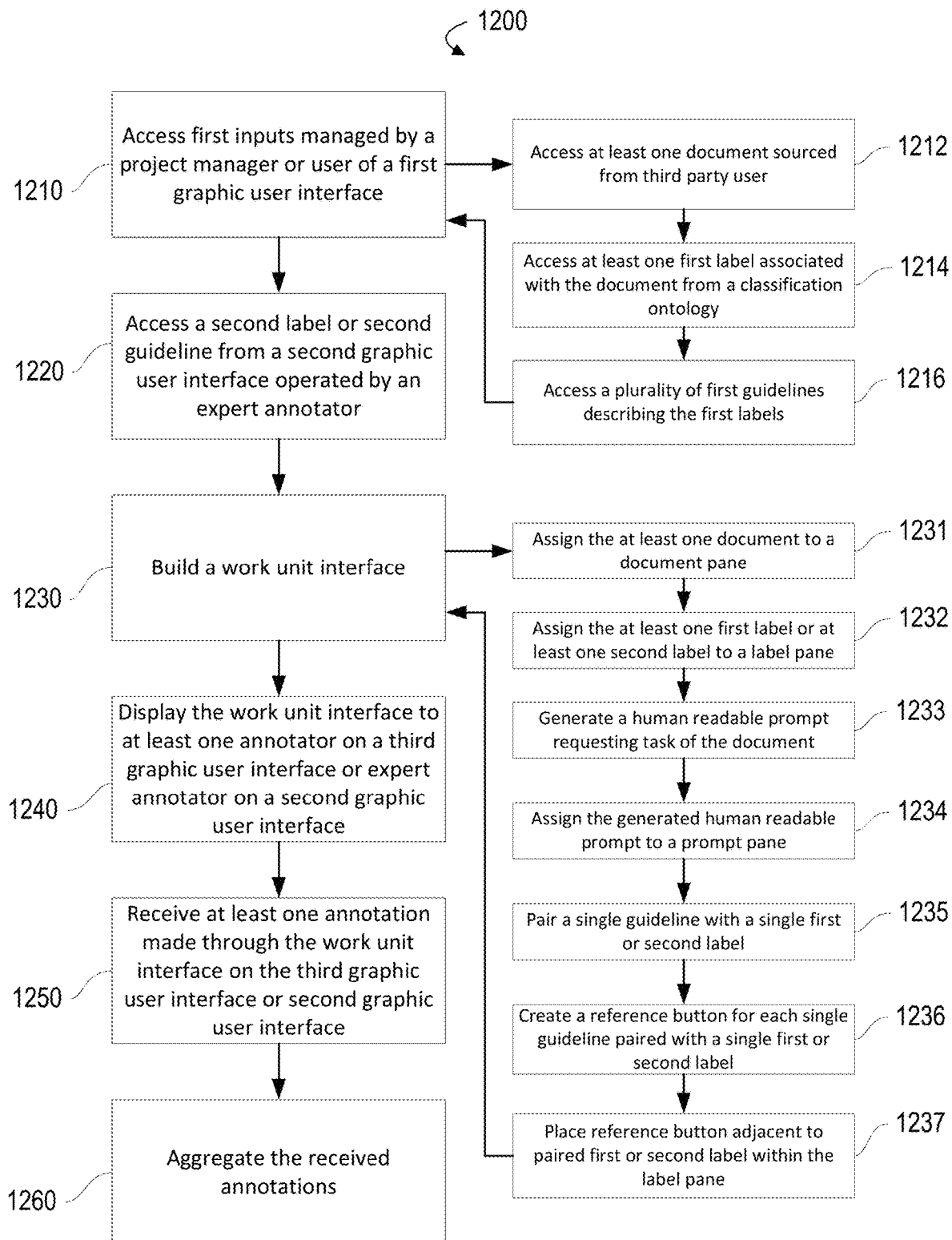
FIG. 12 illustrates an example method for creating and integrating an interface for collecting and aggregating annotations across GUIs, according to some example embodiments.

FIG. 12 illustrates an example of process 1200 for verifying the accuracy of a natural language modeling engine's creation of an ontology of a collection of documents by aggregating human annotations across a series of GUIs. Process 1200 starts at 1210 with accessing a series of inputs through a first GUI, such inputs being those associated with being made by a project manager or similar supervisory role to a collection of documents.

In some embodiments, accessing inputs at 1210 includes accessing at least one document at 1212, such document provided by a third party. A third party access source, in some embodiments, is a customer that provides a collection of documents to be analyzed; in some embodiments, third party access source is a database of a collection of documents such as the database 115 as depicted in FIG. 1. In some embodiments, accessing inputs 1210 further includes accessing at least one first label associated with the document at 1214. In some embodiments, the first label is accessed from an ontology created around the document as built from a natural language modeling engine. In some embodiments, accessing inputs 1210 further includes accessing a plurality of first guidelines describing the first label at 1216. In some embodiments, the first guideline is sourced from a database of guidelines, such as one operated by a natural language modeling engine, that are associated with a list of labels and each first guideline is a description or definition of the label or task.

In some embodiments, at 1220 a second label or second guideline is accessed, such as from a second GUI 214 like the one operated by an expert annotator described in FIG. 2. Collectively, the access of inputs at 1210 and second guidelines and second labels at 1220 provide a plurality of information components for the construction of a work unit interface to permit human annotation to selected documents.

At 1230, in some embodiments, a work unit interface is built. In some embodiments, building the work unit interface at 1230 involves assigning (which depending on embodiment can mean "populating" or "placing") the document accessed at 1212 to a document pane of the work unit interface at 1231. In some embodiments, at 1232 labels are assigned to, and populated in, a label pane of a work unit interface. In some embodiments, the labels assigned to the label pane at 1232 are the first labels accessed at 1214 from an ontology of a collection of documents through a first GUI. In some embodiments, the labels or tasks assigned to the label pane at 1232 are the second labels accessed at 1220 from a second GUI. In some embodiments, the label pane is assigned with a plurality of labels, and in still other embodiments, the plurality of labels assigned the label pane at 1232 includes both first labels and second labels.

At 1233, a human readable prompt is generated to elicit a response from a human annotator that requests a task of the document. In some embodiments, the human readable prompt is generated by an intelligent queuing module of a natural language modeling engine. In some embodiments, the human readable prompt is a question requesting selection of the most applicable label or task assigned in the label pane at 1232 for the document assigned in the document pane at 1231. In some embodiments, the human readable prompts requests selection of all applicable labels or tasks assigned in the label pane of a work unit interface at 1232. One having skill in the art can envision additional human readable prompts requesting a task of a document. At 1234, the generated human readable prompt is assigned to a prompt pane of the work unit interface.

At 1235, a single guideline from one of the first guideline accessed at 1216 or second guideline at 1220 is paired with a single label or task assigned to the label pane of the work unit interface at 1232. In some embodiments several labels or tasks are assigned to the label pane at 1232, and several single guidelines are paired with a single one of the several labels or tasks at 1235. In some embodiments, after pairing the single guideline with a single label at 1235, a reference button is created for the single guideline at 1236. A reference button permits access to the full textual description of the single label paired with the single label without requiring display of the single guideline. In some embodiments, the reference button is placed adjacent to the single label paired with the single button in the label pane at 1237.

In some embodiments, process 1200 continues at 1240 by displaying the built work unit interface to an annotator operating a second GUI or third GUI. In some embodiments, the annotator operating the second GUI is an expert annotator. In some embodiments, the annotator operating the third GUI is an annotator. At 1250, at least one annotation is received through the work unit interface from among the second or third GUIs. At 1260, the annotations received at 1250 are aggregated together.

In some embodiments, process 1300 provides a method of creating interfaces to efficiently manage and manipulate annotated documents to verify and draw conclusions as to the accuracy of a natural language modeling engine. Method 1300 begins at 1310, and in some embodiments step 1310 is a subsequent to step 1260 as described in FIG. 12. At 1310, an annotation agreement interface is built.

In some embodiments, building an annotation agreement interface at 1310 includes a series of substeps 1312, 1314, 1316, and/or 1318. In some embodiments, at 1312 a label feedback pane is created. A label feedback pane includes a plurality of labels or tasks of an ontology from a collection of documents, and in some embodiments further includes a description of the label or task, an indicator of the number of annotations, or action buttons to edit or delete the label or task from the ontology. Editing, in some embodiments, may include removing annotations from the label or task, or applying a new guideline describing the label or task.

In some embodiments, at 1314 a learning curve pane is created. In some embodiments, at 1314 the learning curve pane displays an aggregation of annotations from among GUIs in a network, such as network 200 as depicted in FIG. 2 with a plurality of second GUIs 214 or third GUIs 216. In some embodiments, at 1314 the learning curve pane displays a graphical representation of the relationship between the number of annotations received and the agreement between those annotations. In some embodiments, at 1314 the learning curve pane displays a graphical representation of the relationship between the number of annotations received for a particular label and the accuracy of the natural language model generated for that label.

In some embodiments, the learning curve displayed at 1314 is a learning curve for an entire collection. In some embodiments, the learning curve displayed at 1314 is a learning curve for a particular label or task. By displaying a learning curve, a project manager or user of first GUI 212 can determine whether the annotations are beginning to smooth out and/or approach a consistent agreement regardless of additional annotations or whether the number of additional annotations introduces continued variability (which would be represented as a staggered line in a learning curve) of agreement. With such information, a project manager or user of first GUI 212 can allocate annotators efficiently, such as by ceasing to request annotations for a particular label or task or collection of documents if it is apparent that additional annotations will not appreciably affect the agreement. Or, in instances with a high degree of variability with additional annotations a project manager or user of first GUI 212 could assign additional annotators to provide more human oversight to attempt to reach a consistent agreement level.

In some embodiments, method 1300 continues to 1316 by creating an annotation feedback pane. An annotation feedback pane can be configured to display a plurality of data. In some embodiments, an annotation feedback pane displays an annotation agreement score. An annotation agreement score displays the overall agreement between annotators of the whole collection of documents within the ontology being analyzed, and can indicate the general disposition or accuracy of the entire ontology and whether further by-label or by-task analysis or manipulation is warranted given the overall agreement score or whether annotators should retrained on the definition of particular categories.

In some embodiments, an annotation feedback pane displays at 1316 an individual annotator agreement list with the agreement scores and number of annotations per individual annotator within the collection. Such an individual annotator agreement list indicates whether certain annotators have processed all documents presented them on work unit interfaces of their respective GUIs, or whether certain annotators appear to have trouble with the subject matter is indicated by low agreement scores relative to other annotators. For example, if an overall agreement, such as one displayed in an annotation agreement score, were 0.7 with individual annotator agreement list displaying individual agreements of 0.75, 0.55, 0.7, and 0.77, a project manager could determine that the individual annotator with the 0.55 score should be dropped from the annotation agreement score.

In some embodiments, at 1316 a suggested label collapse list is created. A suggested label collapse list enables a project manager or user of a first GUI to quickly identify the strengths and weaknesses of an ontology and a natural language modeling engine's ability to sort documents into a particular label or task based on the document's content. In some embodiments a suggested label collapse list is created by pairing annotated labels or tasks together and displaying how the annotation agreement score would be affected if the two labels or tasks were combined into a common label or task; in other words, how an annotation agreement score would be affected if annotators were not required to distinguish between certain labels or tasks. Such a feature can indicate whether the natural language modeling engine selected appropriate labels or tasks, or whether guidelines paired with labels or tasks are sufficiently describing the label or task.

In some embodiments, at 1316 an agreement per label graphical representation is created by displaying a bar graph of agreement among annotators for one or more given labels or tasks of the ontology being annotated. In some embodiments, a collapsed agreement per label graphical representation is created by determining the agreement per label or task if certain labels of tasks were collapsed into one another. Such a feature further indicates which labels or tasks within an ontology are more likely to be correctly placed on an ontology by creating an interface for side by side comparison of agreements if labels or tasks were asked to be distinguished from one another or if they were combined.

In some embodiments, at 1316 a per document agreement list is created by identifying those documents with the highest and lowest annotation agreements. In some embodiments, the number of documents displayed in a per document agreement list is determined from an input by a project manager or user of first GUI 212. A per document agreement list allows a project manager or user of a first GUI 212 to determine which documents gave annotators the most difficulty in agreeing on a common label or task, as well as showing which documents have unanimous agreement and make the best exemplars of a category. A project manager or user of first GUI can then review certain documents to determine whether anything particular is giving trouble to annotators, or even remove the document from the ontology for its lack of a clear disposition.

In some embodiments, method 1300 continues at 1318 to create a rules pane for receiving a phrase in a phrase pane, a weighting adjustment in a weighting adjustment pane, or a rule in an add rule pane. In some embodiments, a phrase pane is configured to identify a certain phrase within a document. In some embodiments, a weighting adjustment pane is configured to reduce the relevance of a phrase in the phrase pane relative to other words or phrases in the document such that a natural language modeling engine will emphasize or deemphasize certain phrases. In some embodiments, an add rule pane gives direction for a natural language modeling engine to perform on a phrase in a phrase pane. For example, if the natural language modeling engine recognizing a phrase from the phrase pane in a document, a rule in the add rule pane can dictate how to process that document, such as by placing it in a specific label or task of an ontology, or looking for additional words or phrases before placing the document within an ontology.

In some embodiments, method 1300 continues at 1320 by computing initial annotation agreements from aggregated annotations such as at 1260 as depicted in FIG. 12. In some embodiments, computing initial agreements is performed by an annotations module, such as one of natural language modeling engine 210 depicted in FIG. 2. Computing initial annotation agreements includes not only determining annotation agreement scores among annotators for individual labels or tasks and overall score for an ontology, but also includes in some embodiments computing a learning curve relationship between annotation agreement and number of annotations. In some embodiments at 1320, computing initial annotation agreements determines annotation agreement scores if two or more labels are collapsed into one another. In some embodiments, computing initial annotation agreements computes per label annotation agreements and per label annotation agreements if two or more labels are collapsed into one another and graphical relationships of each. In some embodiments, computing initial annotation agreements at 1320 computes the annotation agreement per each document classified according to an ontology, and identifies the documents with the highest and lowest annotation agreements.

In some embodiments, the computed metrics of 1320 are populated into an annotation agreement interface at 1330. In some embodiments, a label feedback pane is populated with each label of an ontology. In some embodiments, at 1330 the label feedback pane is populated with a description of the label as provided by a natural language modeling engine or project manager of first GUI 212 or expert annotator operating a second GUI 214. In some embodiments, at 1330 the label feedback pane is populated with the number of annotations a label or task has received from annotators operating second GUI 214 or third GUI 216.

In some embodiments, at 1330 the learning curve pane is populated with the computed learning curve metric of the annotation agreement related to the number of annotations, as computed at 1320. In some embodiments, at 1330 the annotation feedback pane is populated with the annotation agreement score for the ontology. In some embodiments, at 1330 the annotation feedback pane of the annotation agreement interface is populated with a suggested label collapse list for the resultant annotation agreement scores corresponding to how the annotation agreement score will change if two or more labels or tasks are collapsed into one another.

In some embodiments, at 1330 the annotation feedback pane of the annotation agreement interface is populated with the per label or task annotation agreements and collapsed agreement per label or task as computed at 1320. In some embodiments, at 1330 a per document agreement is populated in an annotation feedback pane.

In some embodiments, at 1340 the panes of the annotation interface populated at 1330 are displayed to a project manager or user of first GUI 212. With a fully populated annotation agreement interface displayed to such a project manager or user of first GUI 212, method 1300 enables follow on actions to manipulate or refine the documents and annotators to improve the ontology, such as by enabling improved annotations on other work unit interfaces, or removing documents from the ontology.

Figure 14:
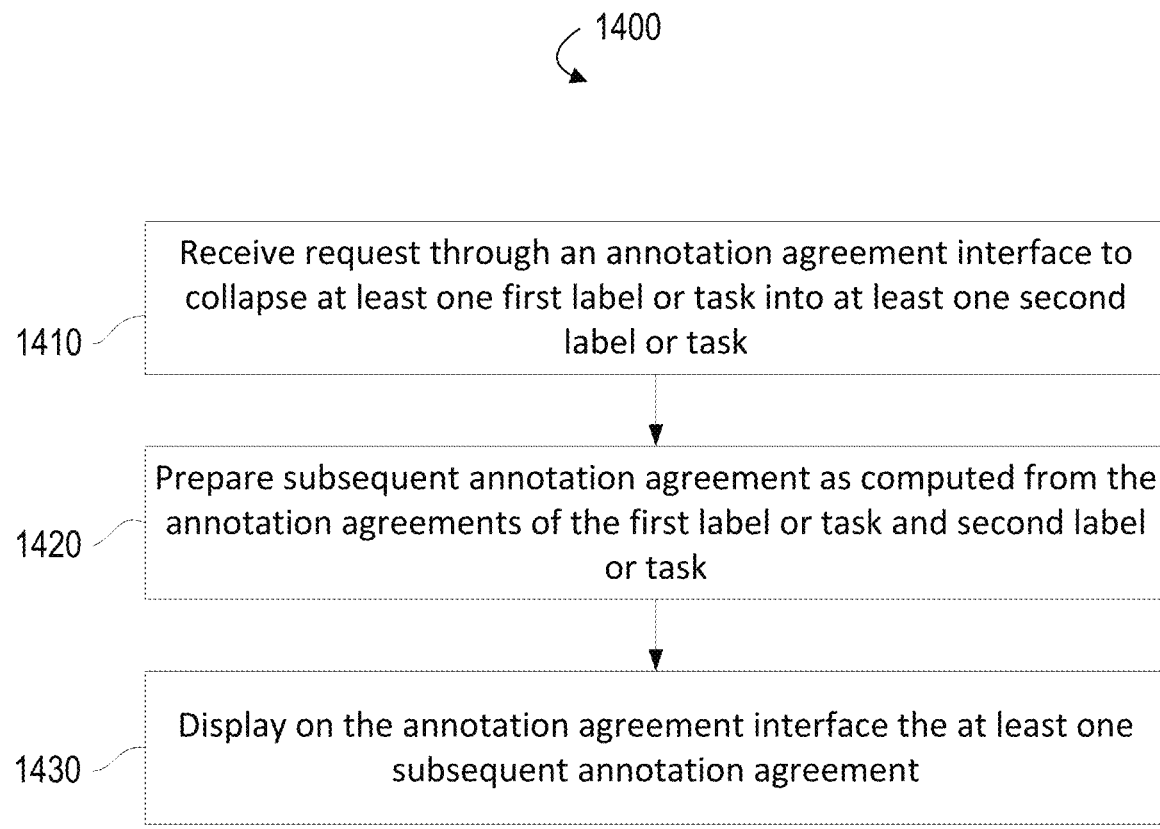
FIG. 14 illustrates an example method of an interface for collapsing labels or tasks into one another and displaying comparative annotation agreements, according to some embodiments.

As depicted in FIG. 14, method 1400 is a method for interacting with information displayed to a project manager or user of first GUI 212 on an annotation agreement interface. In some embodiments, method 1400 begins at 1410 by receiving a request to collapse at least one first label or first task into at least one second label or second task. Such a request to collapse in some embodiments is made, in some embodiments, through the agreement per label graphical representation of the annotation feedback pane. In some embodiments, the request to collapse at 1410 is made through the suggested label collapse list. One of skill in the art can envision numerous ways to select which labels or tasks to collapse into one another through one of the information displays of an annotation agreement interface.

In some embodiments, at 1430 a subsequent annotation agreement is displayed in the annotation feedback pane of the annotation agreement interface after collapsing the labels or tasks in 1410. Such a subsequent annotation agreement can be used as a visual comparison of the annotation agreements before and after collapsing labels or tasks.

Figure 13:
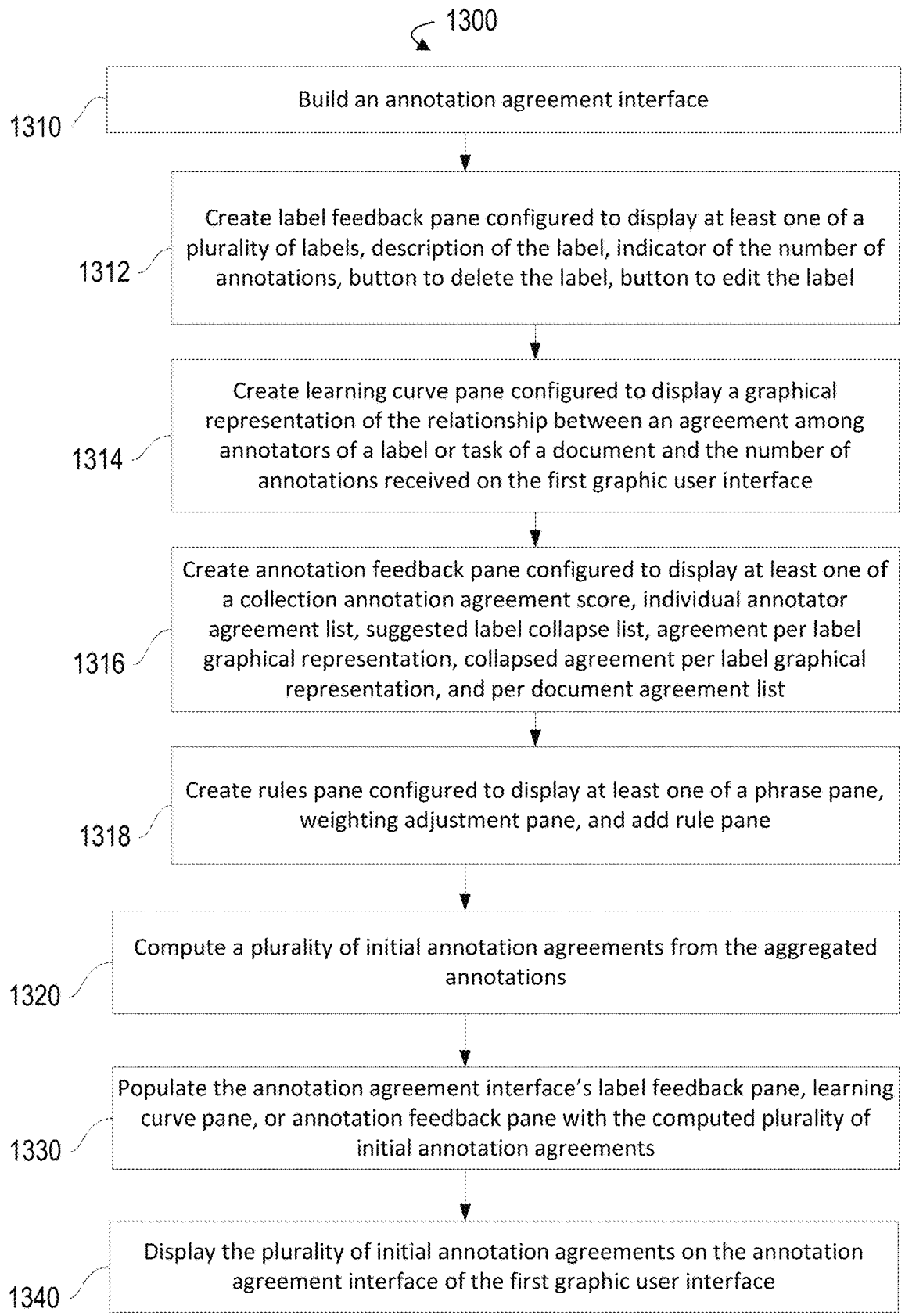
FIG. 13 illustrates an example method for building an annotation agreement interface for analyzing annotations of labels or tasks within an ontology, according to some embodiments.
Figure 15:
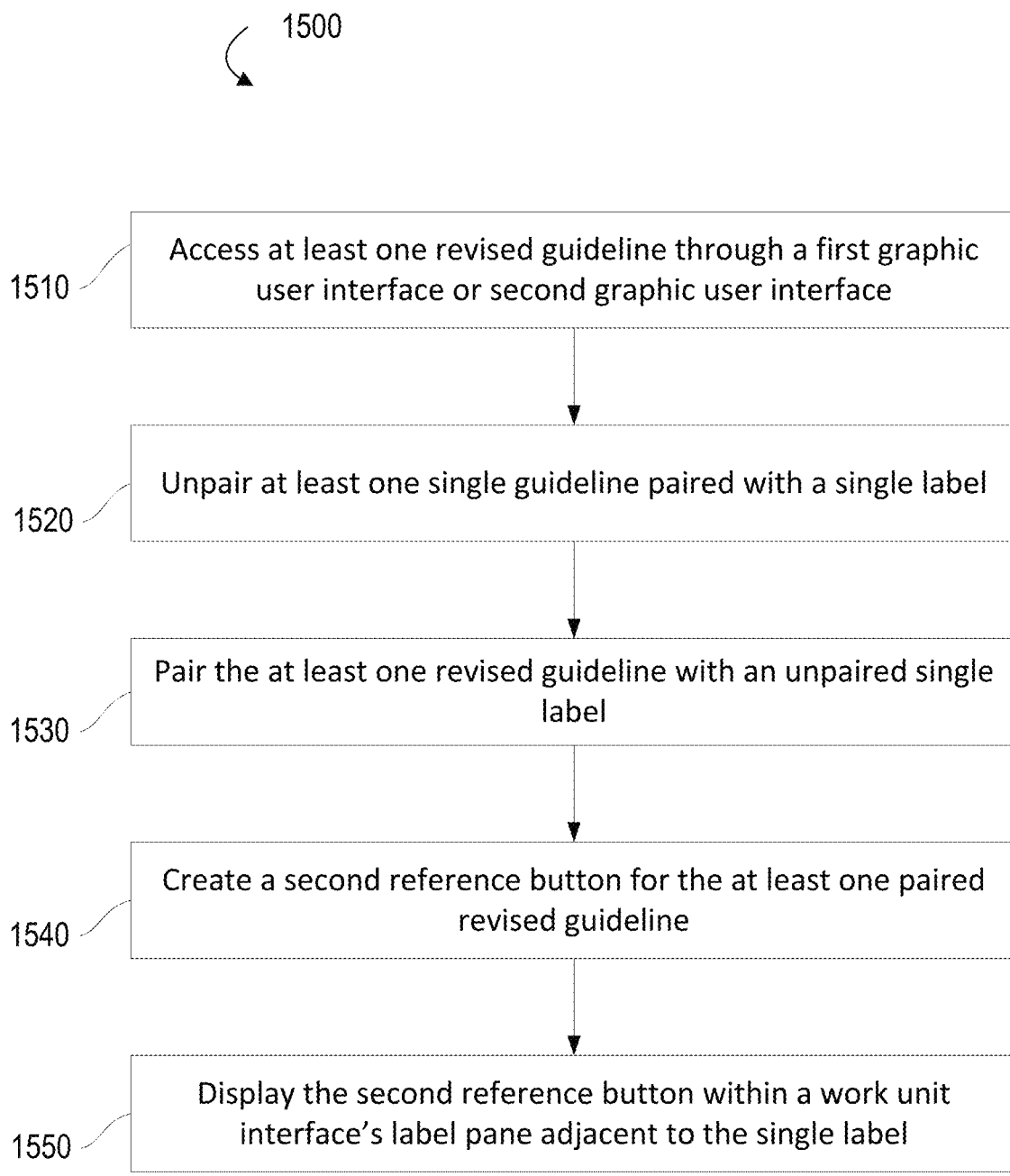
FIG. 15 illustrates an example method of updating a work unit interface with revised guidelines, according to some example embodiments.

FIG. 15 illustrates method 1500 for changes to a work unit interface a project manager or user of first GUI 212 can make in response to information populated on an annotation agreement interface such as by method 1300 described in FIG. 13. In some embodiments, method 1500 is directed to replacing a guideline for a label in a work unit interface. In some embodiments, a project manager or user of first GUI 212 decides to replace a guideline to a label or task in a work unit interface, such as by realizing a per label annotation agreement computed at 1320 in method 1300 is lower relative to other per label annotation agreements. In some embodiments, an expert annotator decides to replace a guideline to a label or task after viewing a paired guideline in a work unit interface from a second GUI and enters a new guideline in the create guideline data field presented on a second GUI such as the create guideline pane 845 as depicted in FIG. 8A.

In some embodiments, method 1500 begins at 1510 by accessing a revised guideline through a first GUI 212 or second GUI 214. In some embodiments, at 1520 the single guideline initially paired with the label or task of the work unit interface (such as at 1235 in FIG.12) is unpaired with the respective label or task. In some embodiments, at 1530, the revised guideline accessed at 1510 is then paired with the label or task that had the single guideline unpaired at 1520. At 1540, a second reference button is created for the newly paired revised guideline with the label or task, and at 1550 the second reference button is displayed on the work unit interface. In some embodiments, the revised guideline is included in addition to the single guideline, such that when an annotator interacting with the work unit interface presses the reference button, both the single guideline and the revised guideline are displayed to the annotator.

It should be appreciated that the specific steps illustrated in FIGS. 12-15 provide a particular process and sequence of interaction among GUIs and the manipulation of the annotations generated on an ontology. Other sequences of steps may also be performed according to alternative embodiments. For example, alternative embodiments may perform the steps outlined above in a different order. Moreover, the individual sequence illustrated in FIGS. 12-15 may include multiple sub-sequences as appropriate to the individual step or direct sequences between different nodes than as illustrated. Furthermore, additional steps may be added or removed depending on the particular applications. One of skill in the art would recognize many variations, modifications, and alternatives.

Figure 16:
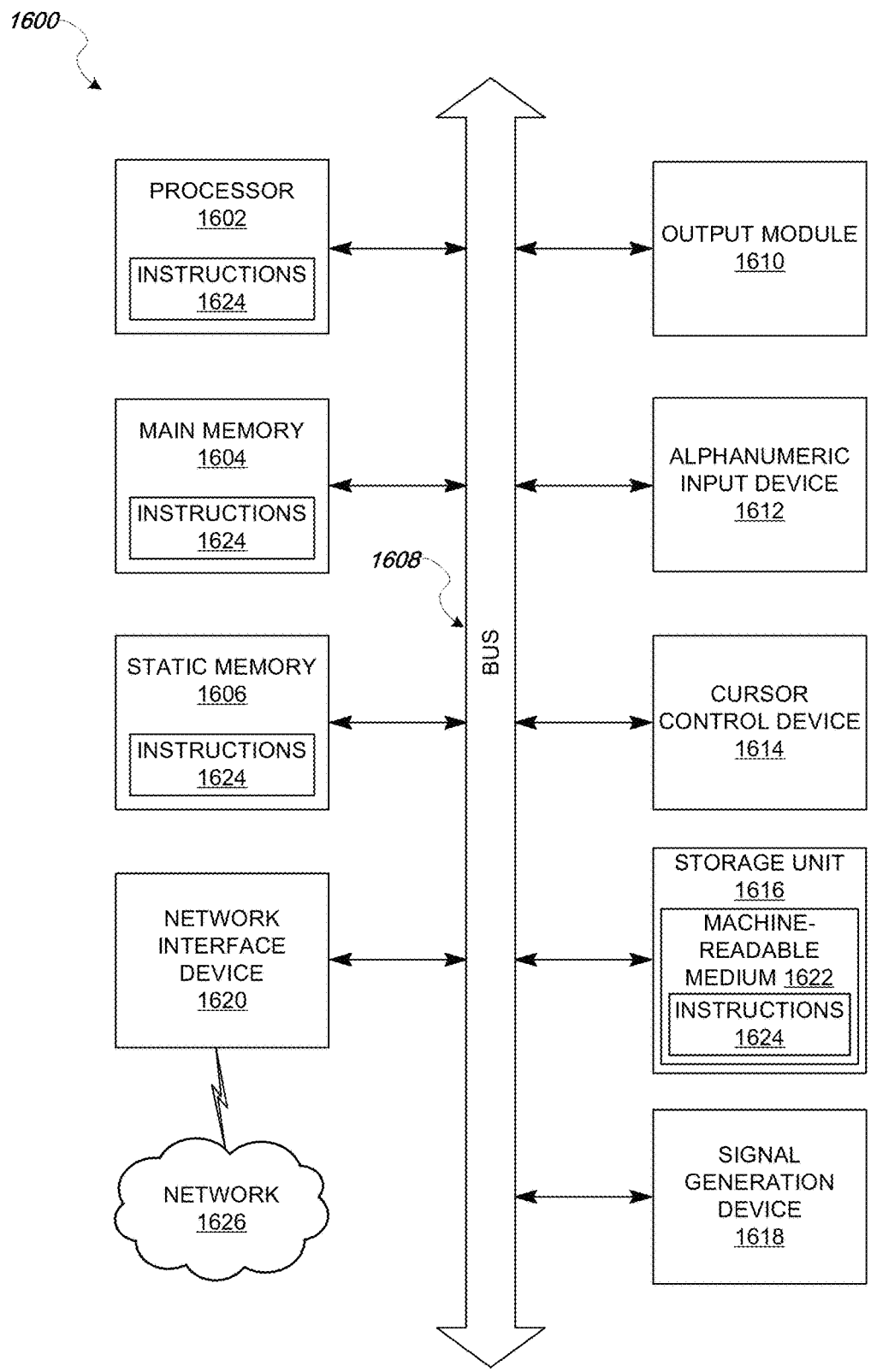
FIG. 16 illustrates a block diagram illustrating components of a machine, according to some example embodiments, able to read instructions from a machine-readable medium and perform any one or more of the methodologies discussed herein.

Referring to FIG. 16, the block diagram illustrates components of a machine 1600, according to some example embodiments, able to read instructions 1624 from a machine-readable medium 1622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 16 shows the machine 1600 in the example form of a computer system (e.g., a computer) within which the instructions 1624 (e.g., software, a program, an application, an applet, an app, or other executable code) for causing the machine 1600 to perform any one or more of the methodologies discussed herein may be executed, in whole or in part.

In alternative embodiments, the machine 1600 operates as a standalone device or may be connected (e.g., networked) to other machines. In a networked deployment, the machine 1600 may operate in the capacity of a server machine 110 or a client machine in a server-client network environment, or as a peer machine in a distributed (e.g., peer-to-peer) network environment. The machine 1600 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1624, sequentially or otherwise, that specify actions to be taken by that machine. Further, while only a single machine 1600 is illustrated, the term "machine" shall also be taken to include any collection of machines that individually or jointly execute the instructions 1624 to perform all or part of any one or more of the methodologies discussed herein.

The machine 1600 includes a processor 1602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1604, and a static memory 1606, which are configured to communicate with each other via a bus 1608. The processor 1602 may contain microcircuits that are configurable, temporarily or permanently, by some or all of the instructions 1624 such that the processor 1602 is configurable to perform any one or more of the methodologies described herein, in whole or in part. For example, a set of one or more microcircuits of the processor 1602 may be configurable to execute one or more modules (e.g., software modules) described herein.

The machine 1600 may further include an input and output module 1610 (e.g., a plasma display panel (PDP), a light emitting diode (LED) display, a liquid crystal display (LCD), a projector, a cathode ray tube (CRT), or any other display capable of displaying graphics or video) configured to display any one of the interfaces described herein. The machine 1600 may also include an alphanumeric input device 1612 (e.g., a keyboard or keypad), a cursor control device 1614 (e.g., a mouse, a touchpad, a trackball, a joystick, a motion sensor, an eye tracking device, or other pointing instrument), a storage unit 1616, a signal generation device 1618 (e.g., a sound card, an amplifier, a speaker, a headphone jack, or any suitable combination thereof), and a network interface device 1620.

The storage unit 1616 includes the machine-readable medium 1622 (e.g., a tangible and non-transitory machine-readable storage medium) on which are stored the instructions 1624 embodying any one or more of the methodologies, functions, or interfaces described herein, including, for example, any of the descriptions of FIGS. 1-15. The instructions 1624 may also reside, completely or at least partially, within the main memory 1604, within the processor 1602 (e.g., within the processor's cache memory), or both, before or during execution thereof by the machine 1600. The instructions 1624 may also reside in the static memory 1606.

Accordingly, the main memory 1604 and the processor 1602 may be considered machine-readable media 1622 (e.g., tangible and non-transitory machine-readable media). The instructions 1624 may be transmitted or received over a network 1626 via the network interface device 1620. For example, the network interface device 1620 may communicate the instructions 1624 using any one or more transfer protocols (e.g., HTTP). The machine 1600 may also represent example means for performing any of the functions described herein, including the processes described in FIGS. 1-15.

In some example embodiments, the machine 1600 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1622 able to store data temporarily or permanently and may be taken to include, but not be limited to, random-access memory (RAM), read-only memory (ROM), buffer memory, flash memory, and cache memory. While the machine-readable medium 1622 is shown in an example embodiment to be a single medium, the term "machine-readable medium" should be taken to include a single medium or multiple media (e.g., a centralized or distributed database 115, or associated caches and servers) able to store instructions 1624. The term "machine-readable medium" shall also be taken to include any medium, or combination of multiple media, that is capable of storing the instructions 1624 for execution by the machine 1600, such that the instructions 1624, when executed by one or more processors of the machine 1600 (e.g., processor 1602), cause the machine 1600 to perform any one or more of the methodologies described herein, in whole or in part. Accordingly, a "machine-readable medium" refers to a single storage apparatus or device 130 or 150, as well as cloud-based storage systems or storage networks that include multiple storage apparatus or devices 130 or 150. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 1622 is non-transitory in that it does not embody a propagating signal. However, labeling the tangible machine-readable medium 1622 as "non-transitory" should not be construed to mean that the medium is incapable of movement; the medium should be considered as being transportable from one physical location to another. Additionally, since the machine-readable medium 1622 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 1622 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1602 or a group of processors 1602) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 1602 or other programmable processor 1602. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 1608) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1602 that are temporarily configured (e.g., by software) or permanently configured to perform the relevant operations. Whether temporarily or permanently configured, such processors 1602 may constitute processor-implemented modules that operate to perform one or more operations or functions described herein. As used herein, "processor-implemented module" refers to a hardware module implemented using one or more processors 1602.

Similarly, the methods described herein may be at least partially processor-implemented, a processor 1602 being an example of hardware. For example, at least some of the operations of a method may be performed by one or more processors 1602 or processor-implemented modules. As used herein, "processor-implemented module" refers to a hardware module in which the hardware includes one or more processors 1602. Moreover, the one or more processors 1602 may also operate to support performance of the relevant operations in a "cloud computing" environment or as a "software as a service" (SaaS). For example, at least some of the operations may be performed by a group of computers (as examples of machines 1600 including processors 1602), with these operations being accessible via a network 1626 (e.g., the Internet) and via one or more appropriate interfaces (e.g., an application program interface or "API").

The performance of certain operations may be distributed among the one or more processors 1602, not only residing within a single machine 1600, but deployed across a number of machines 1600. In some example embodiments, the one or more processors 1602 or processor-implemented modules may be located in a single geographic location (e.g., within a home environment, an office environment, or a server farm). In other example embodiments, the one or more processors 1602 or processor-implemented modules may be distributed across a number of geographic locations.

Unless specifically stated otherwise, discussions herein using words such as "processing," "computing," "calculating," "determining," "presenting," "displaying," or the like may refer to actions or processes of a natural language modeling engine 210 (e.g., a on a computing device or external server such as server machine 110 depicted in FIG. 1 or as part of a system of interconnected interfaces as depicted in FIG. 2) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A method comprising:
   accessing first inputs managed through a first graphic user interface operated by a project manager, wherein accessing first inputs comprises:
      accessing at least one document sourced by a third party user;
      accessing at least one first label associated with the at least one document, wherein the at least one first label is selected from a classification ontology built from a collection comprising the at least one document; and
      accessing at least one first guideline describing the at least one first label;
   constructing a first work unit interface, wherein constructing the first work unit interface comprises:
      assigning a document among the at least one document to a document pane within the first work unit interface;
      assigning the at least one first label to a label pane within the first work unit interface;
      generating a human readable prompt requesting a task of the document, wherein the task is a confirmation of the accuracy for classification of the at least one first label for the document within the classification ontology;
      assigning the generated human readable prompt to a prompt pane within the first work unit interface;
      pairing a single first guideline from the at least one first guideline with a single label of the at least one first label;
      creating a reference button for each single first guideline paired with a single label; and
      placing the reference button adjacent to the paired label within the label pane of the first work unit interface;
   displaying to at least one expert annotator operating a second graphic user interface the first work unit interface comprising each of the document, the human readable prompt, the at least one first label, and the reference button for each single first guideline;
   accessing a second input from the second graphic user interface operated by the expert annotator, wherein the second input comprises at least one second guideline describing the at least one first label;
   constructing a second work unit interface, wherein constructing the second work unit interface comprises:
      assigning the document to a document pane within the second work unit interface;
      assigning the at least one first label to a label pane within the second work unit interface;
      assigning the generated human readable prompt to a prompt pane within the second work unit interface;
      pairing a single second guideline from the at least one second guideline with the single label of the at least one first label;
      creating a reference button for each single second guideline paired with a single label; and
      placing the reference button for each single second guideline adjacent to the paired label within the label pane of the second work unit interface;
   displaying to at least one annotator operating a third graphic user interface the second work unit interface comprising each of the document, the human readable prompt, the at least one first label, and the reference button for each single second guideline;
   receiving at least one annotation on the second work unit interface displayed on the third graphic user interface; and
   aggregating the at least one annotation on the first graphic user interface operated by the project manager.

2. The method of claim 1, wherein aggregating the at least one annotation further comprises:
   constructing an annotation agreement interface, wherein constructing an annotation agreement interface further comprises:
      creating a label feedback pane, wherein the label feedback pane is configured to display at least one from the group comprising a plurality of label panes and each label pane comprising a description of a label, an indicator of the number of annotated documents associated with the label, a button to delete the label from the classification ontology, and a button to edit the label;

creating a learning curve pane, wherein the learning curve pane is configured to display a graphical representation of the relationship among a number of annotations aggregated on the first graphic user interface, an agreement among annotators of a label or task of a document, and an accuracy of the classification ontology;

creating an annotation feedback pane, wherein the annotation feedback pane is configured to display at least one of the group comprising a collection annotation agreement score, an individual annotator agreement list, a suggested label collapse list, an agreement per label graphical representation, a collapsed agreement per label graphical representation, and a per document agreement list; and creating a rules pane, wherein the rules pane is configured to display at least one of the group comprising a phrase pane, a weighting adjustment pane, and an add rule pane.

3. The method of claim 2, further comprising computing a plurality of initial annotation agreements from the aggregated annotations.

4. The method of claim 3, further comprising populating the annotation agreement interface's label feedback pane, learning curve pane, and annotation feedback pane with computed initial annotation agreements.

5. The method of claim 4, further comprising displaying the plurality of initial annotation agreements on the annotation agreement interface of the first graphic user interface.

6. The method of claim 5, further comprising:
receiving a request through the annotation agreement interface of the first graphic user interface to collapse at least one first label or task into at least one second label or task;
preparing at least one subsequent annotation agreement as computed from the initial annotation agreement of the first label or task and second label or task collapsed into one another; and
displaying on the annotation agreement interface of the first graphic user interface the at least one subsequent annotation agreement among the plurality of initial annotation agreements.

7. The method of claim 6, further comprising:
unpairing the single first guideline paired with the single label on the first work unit interface;
pairing the single second guideline with the unpaired single label on the first work unit interface;
creating a second reference button for the paired single second guideline paired with the single label; and
displaying the second reference button within the first work unit interface's label pane adjacent to the single label.

8. A non-transitory computer readable medium comprising instructions that, when executed by a processor, cause the processor to perform operations comprising:
accessing first inputs managed through a first graphic user interface operated by a project manager, wherein accessing first inputs comprises:
accessing at least one document sourced by a third party user;
accessing at least one first label associated with the at least one document, wherein the at least one first label is selected from a classification ontology built from a collection comprising the at least one document; and
accessing at least one first guideline describing the at least one first label;

constructing a first work unit interface, wherein constructing the first work unit interface comprises:
assigning a document among the at least one document to a document pane within the first work unit interface;
assigning the at least one first label to a label pane within the first work unit interface;
generating a human readable prompt requesting a task of the document, wherein the task is a confirmation of the accuracy for classification of the at least one first label for the document within the classification ontology;
assigning the generated human readable prompt to a prompt pane within the first work unit interface;
pairing a single first guideline from the at least one first guideline with a single label of the at least one first label;
creating a reference button for each single first guideline paired with a single label; and
placing the reference button adjacent to the paired label within the label pane of the first work unit interface;
displaying to at least one expert annotator operating a second graphic user interface the first work unit interface comprising each of the document, the human readable prompt, the at least one first label, and the reference button for each single first guideline;
accessing a second input from the second graphic user interface operated by the expert annotator, wherein the second input comprises at least one second guideline describing the at least one first label;
constructing a second work unit interface, wherein constructing the second work unit interface comprises:
assigning the document to a document pane within the second work unit interface;
assigning the at least one first label to a label pane within the second work unit interface;
assigning the generated human readable prompt to a prompt pane within the second work unit interface;
pairing a single second guideline from the at least one second guideline with the single label of the at least one first label;
creating a reference button for each single second guideline paired with a single label; and
placing the reference button for each single second guideline adjacent to the paired label within the label pane of the second work unit interface;
displaying to at least one annotator operating a third graphic user interface the second work unit interface comprising each of the document, the human readable prompt, the at least one first label, and the reference button for each single second guideline;
receiving at least one annotation on the second work unit interface displayed on the third graphic user interface; and
aggregating the at least one annotation on the first graphic user interface operated by the project manager.

9. The computer readable medium of claim 8, wherein the operations to aggregate the at least one annotation further comprise:
constructing an annotation agreement interface, wherein constructing an annotation agreement interface further comprises:
creating a label feedback pane, wherein the label feedback pane is configured to display at least one from the group comprising a plurality of label panes and each label pane comprising a description of a label, an indicator of the number of annotated documents associated with the label, a button to delete the label from the classification ontology, and a button to edit the label;

creating a learning curve pane, wherein the learning curve pane is configured to display a graphical representation of the relationship among a number of annotations aggregated on the first graphic user interface, an agreement among annotators of a label or task of a document, and an accuracy of the classification ontology;

creating an annotation feedback pane, wherein the annotation feedback pane is configured to display at least one of the group comprising a collection annotation agreement score, an individual annotator agreement list, a suggested label collapse list, an agreement per label graphical representation, a collapsed agreement per label graphical representation, and a per document agreement list; and creating a rules pane, wherein the rules pane is configured to display at least one of the group comprising a phrase pane, a weighting adjustment pane, and an add rule pane.

10. The computer readable medium of claim 9, wherein the operations further comprise:

computing a plurality of initial annotation agreements from the aggregated annotations.

11. The computer readable medium of claim 10, wherein the operations further comprise:

populating the annotation agreement interface's label feedback pane, learning curve pane, and annotation feedback pane with computed initial annotation agreements.

12. The computer readable medium of claim 11, wherein the operations further comprise:

displaying the plurality of initial annotation agreements on the annotation agreement interface of the first graphic user interface.

13. The computer readable medium of claim 12, wherein the operations further comprise:

receiving a request through the annotation agreement interface of the first graphic user interface to collapse at least one first label or task into at least one second label or task;

preparing at least one subsequent annotation agreement as computed from the initial annotation agreement of the first label or task and second label or task collapsed into one another; and displaying on the annotation agreement interface of the first graphic user interface the at least one subsequent annotation agreement among the plurality of initial annotation agreements.

14. The computer readable medium of claim 13, wherein the operations further comprise:

unpairing the single first guideline paired with the single label on the first work unit interface;

pairing the single second guideline with the unpaired single label on the first work unit interface;

creating a second reference button for the paired single second guideline paired with the single label; and displaying the second reference button within the first work unit interface's label pane adjacent to the single label.

15. An interface integration system comprising:

a data processor;

an input and output module from at least one of a first graphic user interface associated with a project manager, a second graphic user interface operated by an expert annotator, and a third graphic user interface operated by an annotator;

a natural language modeling engine operably coupled to the input and output module, configured to execute instructions received from the data processor to:

access first inputs managed by the first graphic user interface, wherein the access to first inputs further comprises:

access at least one document sourced by a third party user;

access at least one first label associated with the at least one document, wherein the at least one first label is selected from a classification ontology built from a collection comprising the at least one document; and access at least one first guideline describing the at least one first label;

construct a first work unit interface, wherein to construct the first work unit interface the natural language modeling engine is further configured to:

assign a document among the at least one document to a document pane within the first work unit interface;

assign the at least one first label to a label pane within the first work unit interface;

generate a human readable prompt requesting a task of the document, wherein the task is a confirmation of the accuracy for classification of the at least one first label for the document within the classification ontology;

assign the generated human readable prompt to a prompt pane within the first work unit interface;

pair a single first guideline from the at least one first guideline with a single label of the at least one first label;

create a reference button for each single first guideline paired with a single label; and place the reference button adjacent to the paired label within the label pane of the first work unit interface;

display to at least one expert annotator operating the second graphic user interface the first work unit interface comprising each of the document, the human readable prompt, the at least one first label, and the reference button for each single first guideline;

access a second input from the second graphic user interface operated by the expert annotator, wherein the second input comprises at least one second guideline describing the at least one first label;

construct a second work unit interface, wherein to construct the second work unit interface the natural language modeling engine is further configured to:

assign the document to a document pane within the second work unit interface;

assign the at least one first label to a label pane within the second work unit interface;

assign the generated human readable prompt to a prompt pane within the second work unit interface;

pair a single second guideline from the at least one second guideline with the single label of the at least one first label;

create a reference button for each single second guideline paired with a single label; and place the reference button for each single second guideline adjacent to the paired label within the label pane of the second work unit interface;

display to at least one annotator operating the third graphic user interface the second work unit interface comprising each of the document, the human readable prompt, the at least one first label, and the reference button for each single second guideline;

receive at least one annotation on the second work unit interface displayed on the third graphic user interface; and aggregate the at least one annotation in an annotation agreement interface of the first graphic user interface associated with the project manager.

16. The interface integration system of claim 15, wherein the natural language modeling engine operably coupled to the input and output module is further configured to execute instructions received from the data processor to:

construct an annotation agreement interface, wherein the instructions to construct an annotation agreement interface further comprises instructions to:

create a label feedback pane, wherein the instructions to create a label feedback pane configure the display of at least one from the group comprising a plurality of label panes and each label pane comprising a description of a label, an indicator of the number of annotated documents associated with the label, a button to delete the label from the classification ontology, and a button to edit the label;

create a learning curve pane, wherein the instructions to create a learning curve pane configure the display of a graphical representation of the relationship among a number of annotations aggregated on the first graphic user interface, an agreement among annotators of a label or task of a document, and an accuracy of the classification ontology;

create an annotation feedback pane, wherein the instructions to create an annotation feedback pane configured the display of at least one of the group comprising a collection annotation agreement score, an individual annotator agreement list, a suggested label collapse list, an agreement per label graphical representation, a collapsed agreement per label graphical representation, and a per document agreement list; and create a rules pane, wherein the instructions to create a rules pane configure the display of at least one of the group comprising a phrase pane, a weighting adjustment pane, and an add rule pane.

17. The interface integration system of claim 16, wherein the natural language modeling engine operably coupled to the input and output module is further configured to execute instructions received from the data processor to:

compute a plurality of initial annotation agreements from the aggregated annotations; and populate the annotation agreement interface's label feedback pane, learning curve pane, and annotation feedback pane.

18. The interface integration system of claim 17, wherein the natural language modeling engine operably coupled to the input and output module is further configured to execute instructions from the data processor to display the plurality of initial annotation agreements on the annotation agreement interface of the first graphic user interface.

19. The interface integration system of claim 18, wherein the natural language modeling engine operably coupled to the input and output module is further configured to execute instructions received from the data processor to:

receive a request through the annotation agreement interface of the first graphic user interface to collapse at least one first label or task into at least one second label or task;

prepare at least one subsequent annotation agreement as computed from the initial annotation agreement of the first label or task and second label or task collapsed into one another; and display on the annotation agreement interface of the first graphic user interface the at least one subsequent annotation agreement among the plurality of initial annotation agreements.

20. The interface integration system of claim 19, wherein the natural language modeling engine operably coupled to the input and output module is further configured to execute instructions received from the data processor to:

unpair the single first guideline paired with the single label on the first work unit interface;

pair the single second guideline with the unpaired single label on the first work unit interface;

create a second reference button for the paired single second guideline paired with the single label; and display the second reference button within the first work unit interface's label pane adjacent to the single label.

* * * * *